(12) United States Patent
Suzuki et al.

(10) Patent No.: US 6,653,012 B2
(45) Date of Patent: Nov. 25, 2003

(54) HUMIDIFIER

(75) Inventors: Motohiro Suzuki, Saitama (JP);
Toshikatsu Katagiri, Saitama (JP);
Yoshio Kusano, Saitama (JP); Hiroshi Shimanuki, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 214 days.

(21) Appl. No.: 09/764,277

(22) Filed: Jan. 19, 2001

(65) Prior Publication Data

US 2001/0021467 A1 Sep. 13, 2001

(30) Foreign Application Priority Data

Jan. 19, 2000 (JP) .................................... 2000-010969
Jan. 19, 2000 (JP) .................................... 2000-010970
Jan. 19, 2000 (JP) .................................... 2000-010971

(51) Int. Cl.$^7$ ................................................ H01M 2/14
(52) U.S. Cl. ................................. 429/39; 95/44; 96/8
(58) Field of Search ........................ 261/104, 142, 261/154; 96/8, 5; 128/201.13; 95/44, 45; 9/8; 429/39

(56) References Cited

U.S. PATENT DOCUMENTS 4,840,227 A * 6/1989 Schmidt ...................... 165/162
6,156,096 A * 12/2000 Sirkar ............................ 95/44

FOREIGN PATENT DOCUMENTS

JP             7-71795            3/1995

* cited by examiner

*Primary Examiner*—Randy Gulakowski
*Assistant Examiner*—Monique Wills
(74) *Attorney, Agent, or Firm*—Arent Fox Kintner Plotkin & Kahn, PLLC

(57) ABSTRACT

A humidifier having a plurality of water-permeable hollow fiber membranes placed along the lengthwise direction of a housing accommodated within the housing in which gases each having a different moisture content flow inside and outside said hollow fiber membranes to carry out moisture exchange whereby the dry air having a low moisture content is humidified is disclosed. The said humidifier (1) comprises a gas inlet formed on an end of the lengthwise direction of the housing, (2) has a construction for generating a turbulent flow provided on the inner surface of said housing, or (3) has a construction for generating a turbulent flow provided within the hollow fiber membranes.

23 Claims, 19 Drawing Sheets

X-X cross-section

Y-Y cross-section

FIG.10A
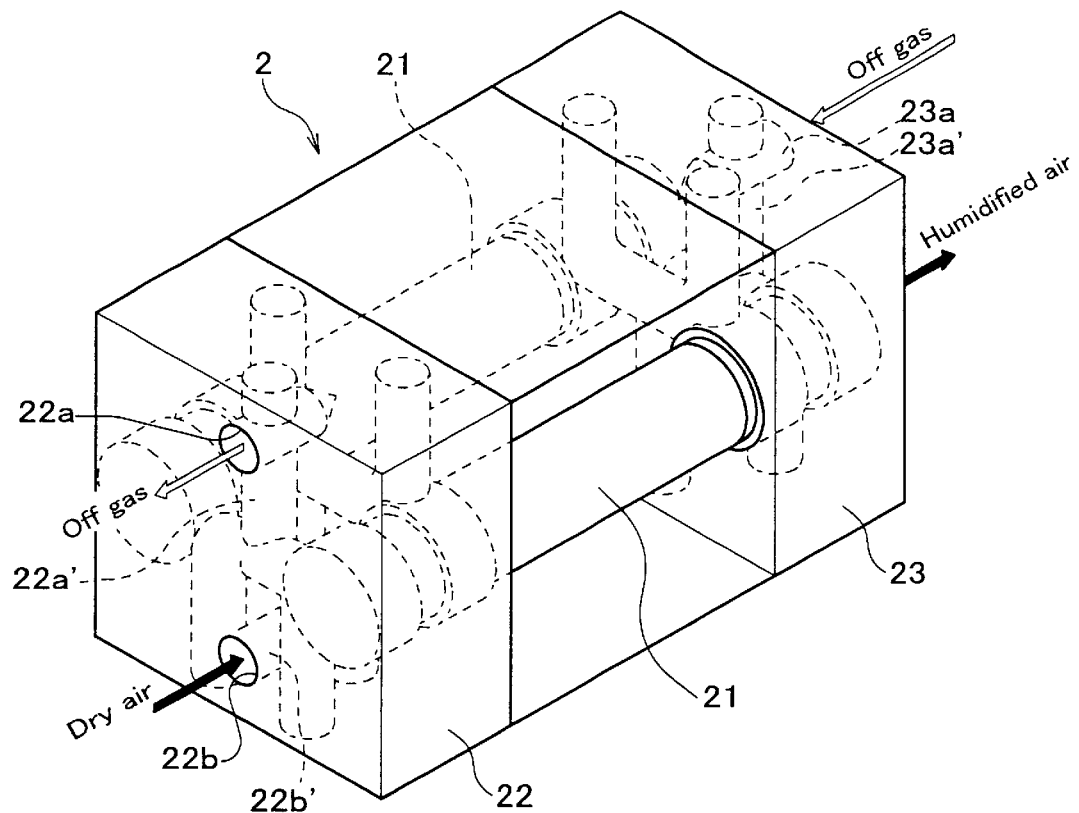
FIG.10B
FIG.10C
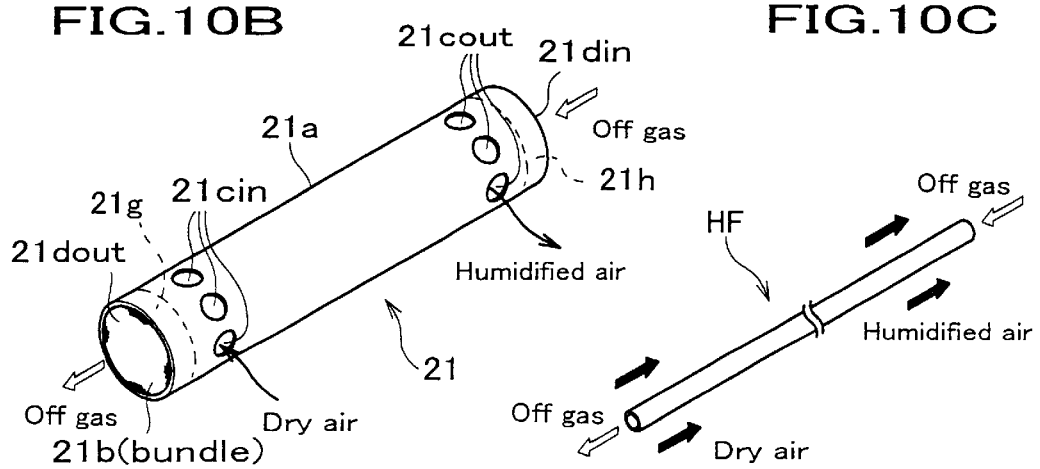

X-X cross-section

Y-Y cross-section

A-A cross-section

C-C cross-section

Hollow fiber membrane module (Hollow fiber membrane module)

HUMIDIFIER

FIELD OF THE INVENTION

The present invention relates to a humidifier, a fuel cell system utilizing the same and a humidification process, and particularly to a humidifier utilizing a hollow fiber membrane, a fuel cell system utilizing the same and a humidification process.

BACKGROUND ARTS

Fuel cell systems, especially solid polymer fuel cell systems are widely known as a power source for electric vehicles. In such fuel cell systems, a humidifier is used to moisture-exchange off gas, viz. moist gas discharged from a fuel cell, between its moisture and air as a dry gas, and to generate humidified air or humidified gas. Preferably, a humidifier used with such fuel cell systems is of a lower power consumption type, and is required compactness with less attachment space. For this reason, among many other humidifiers, such as a supersonic humidifier, a steam humidifier, a vaporizing humidifier and a nozzle injection type humidifier, a humidifier utilizing water permeable membranes, especially hollow fiber membranes is commonly used with a fuel cell.

A conventional humidifier utilizing hollow fiber membranes is disclosed in Japanese Laid-open Patent Publication No. HEI-7-71795. As shown in FIG. 23, a humidifier 300 comprises a housing 301, on which is provided a first inlet 302 for introducing dry air and a first outlet 303 for discharging the dry air (humidified dry air). A bundle of hollow fiber membranes 304 consisting of a number of for example 5000 hollow fiber membranes is accommodated within the housing 301.

At both ends of the housing 301, fastening members 305, 305' are provided for fixing the ends of the bundle 304 while leaving them open. Outside of the fastening member 305 is provided a second inlet 306 for introducing moist air or moist gas, and a second outlet 307 is provided outside of the fastening member 305' for discharging the moist air, moisture of which is separated and removed at the bundle of hollow fiber membranes 304. The fastening members 305, 305' are covered with a first head cover 308 and a second head cover 309, respectively. And the second inlet 306 is formed on the first head cover 308, while the second outlet 307 is formed on the second head cover 309.

In the aforementioned humidifier 300 utilizing hollow fiber membranes, the moist air introduced from the second inlet 306 passes through the hollow fiber membranes forming the bundle of hollow fiber membranes 304, and the moisture within the moist air is separated by capillary action of the hollow fiber membranes. The separated moisture moves outward of the hollow fiber membrane through a capillary tube of the membrane. The moisture-removed air is discharged from the second outlet 307.

Meanwhile, dry air is supplied from the first inlet 302. The dry air from the first inlet 302 flows outside of the hollow fiber membranes forming the bundle of hollow fiber membranes. Because the moisture separated from the moist air has moved outside of the hollow fiber membranes, the moisture humidifies the dry air. The humidified dry air is then discharged from the first outlet 303.

However, in the conventional humidifier 300 shown in FIG. 23, the first air inlet 302 which introduces the dry air is formed on the housing 301 at the side near the center of the lengthwise direction thereof. For this reason, as shown in the black arrow of FIG. 23, the dry air flowing outside of the hollow fiber membranes in the bundle 304 of the hollow fiber membrane stored within the housing 301 flows the central portion in the lengthwise direction within the housing 301. Consequently, the areas S residing near the ends of the bundle 304 of the hollow fiber membranes do not contribute to the exchange of water in a sufficient manner and, thus there is a problem that the ratio of moisture recovery at such portions unduly low in relative to the permeable water within the hollow fiber membranes.

SUMMARY OF THE INVENTION

The first object of the present invention is to make it possible to water exchange in a sufficient manner even at the portions near the ends of the hollow fiber membranes of the bundle of the hollow fiber membranes stored within the housing to thereby improve the ratio of moisture recovery of the humidifier.

The second object of the present invention is to provide a humidifier which can improve the recovery of water utilizing a turbulent flow when the dry air flows outside a bundle of hollow fiber membranes composed of a plurality of water-permeable hollow fiber membranes accommodated within the housing of the hollow fiber membrane module.

The third object of the present invention is to provide a humidifier suitably used for the humidification of the fuel cell, which can improve the water-permeability from the moist gas to the dry gas.

(First Aspect)

According to the first of the present invention which can attain these and other objects, there is provided a humidifier having a plurality of water-permeable hollow fiber membranes placed along the lengthwise direction of a housing accommodated within the housing in which gases each having a different moisture content flow inside and outside said hollow fiber membranes to carry out moisture exchange whereby the dry air having a low moisture content is humidified, said humidifier comprising a gas inlet which introduce the gas flowing outside the hollow fiber membranes within the housing formed on an end of the lengthwise direction of the housing.

According to the first aspect of the present invention, a gas inlet which introduce the gas flowing outside the hollow fiber membranes within the housing is formed on an end of the lengthwise direction of the housing. For this reason, the gas flowing outside of the hollow fiber membranes can be spread over the ends of the housing and, thus the water exchange can be carried out in a sufficient manner, even at the ends of the bundle of the hollow fiber membranes.

In the humidifier according to the first aspect, an injector which injects the gas flowing outside the hollow fiber membranes may be placed directionally to an end of the lengthwise direction of the housing.

In this embodiment, the gas flowing outside the hollow fiber membranes is injected toward the end of the housing. For this reason, the gas flowing outside of the hollow fiber membranes can be spread over the ends of the housing. Consequently, the water exchange can be carried out in much more sufficient manner, not only at the center but also at the ends of the bundle of the hollow fiber membranes, improving the recovery of water.

In the humidifier according to the first aspect, an injector which injects the gas flowing outside the hollow fiber membranes may also be placed toward the center of the lengthwise direction of the housing, alternative to the direction of the end of the housing.

In this embodiment, the gas flowing outside the hollow fiber membranes is injected from the end(s) of the lengthwise direction of the housing toward the center of the housing. Due to the current of the gas flowing outside the hollow fiber membranes, the gas flowing outside the hollow fiber membranes can be supplied over the whole areas of the housing. As a result, the water can be effectively recovered from the entire areas of bundle of the hollow fiber membranes including the ends of the housing, improving the recovery of the water.

In the humidifier according to the first aspect where the injector is provided, a generator which generate a circular flow of the gas flowing outside the hollow fiber membranes injected from the injector may be provided.

According to this embodiment, the gas flowing outside the hollow fiber membranes is injected as a circular flow. This makes the gas flowing outside the hollow fiber membranes turbulent flow. Due to the turbulent flow of the gas flowing outside the hollow fiber membranes, the gas flowing outside the hollow fiber membranes can be spread over the entire area of the housing from one end to another end of the housing in much more effective manner. What is more, the gas flowing outside the hollow fiber membranes can reside within the housing over a prolonged period of time, which contributes to the improvement in the recovery of water.

The humidifier according to the first aspect of the present invention can be suitably used as the humidifier in a fuel cell system.

According to the first aspect of the present invention, there is also provided a humidification process utilizing a hollow fiber membrane module comprising a plurality of water-permeable hollow fiber membranes placed along the lengthwise direction of a housing accommodated within the housing, in which gases each having a different moisture content flow inside and outside said hollow fiber membranes to carry out moisture exchange whereby the dry air having a low moisture content is humidified, said process comprising injecting the gas flowing outside the hollow fiber membranes toward an end or the center of the lengthwise direction of the housing.

According such a configuration, the gas flowing outside of the hollow fiber membranes can be spread over the ends of the housing and, thus the water exchange can be carried out in a sufficient manner, even at the ends of the bundle of the hollow fiber membranes. Alternatively due to the current of the gas flowing outside the hollow fiber membranes, the gas flowing outside the hollow fiber membranes can be supplied over the whole areas of the housing. As a result, the water can be effectively recovered from the entire areas of bundle of the hollow fiber membranes including the ends of the housing, improving the recovery of the water.

(Second Aspect)

According to the second aspect of the present invention which can attain these and other objects, there is provided a humidifier having a plurality of water-permeable hollow fiber membranes placed along the lengthwise direction of a housing accommodated within the housing in which gases each having a different moisture content flow inside and outside said hollow fiber membranes to carry out moisture exchange whereby the dry air having a low moisture content is humidified, said humidifier having a construction for generating a turbulent flow provided on the inner surface of said housing.

By providing the construction for generating a turbulent flow on the inner surface of the housing, since the dry gas rectified along the inner surface to be laminar flow collides with the construction for generating a turbulent flow to be a turbulent flow, the dry air thoroughly flows over the external surface of the bundle of hollow fiber membranes. Accordingly, the moisture recovery (humidified amount) becomes large where the dry gas having a low moisture content recovers the moisture (water) from the moist gas having a large moisture content.

In this humidifier according to the second aspect, the construction for generating a turbulent flow is a groove or grooves provided on the inner surface of the housing.

By providing the grooves on the inner surface of the housing, the dry gas rectified along the inner surface to be laminar flow may be disturbed at the grooves to be a turbulent flow. As a result, the dry gas uniformly flows on the external surface of the bundle of the hollow fiber membranes accommodated within the housing and thus, the moisture recovery (humidified amount) becomes large where the dry gas having a low moisture content recovers the moisture (water) from the moist gas having a large moisture content.

In this humidifier according to the second aspect, the construction for generating a turbulent flow is a projection or projections provided on the inner surface of the housing.

By providing the projections on the inner surface of the housing, the dry gas rectified along the inner surface to be laminar flow may be disturbed at the grooves to be a turbulent flow. As a result, the dry gas uniformly flows on the external surface of the bundle of the hollow fiber membranes accommodated within the housing and thus, the moisture recovery (humidified amount) becomes large where the dry gas having a low moisture content recovers the moisture (water) from the moist gas having a large moisture content.

In this humidifier according to the second aspect, the construction for generating a turbulent flow is made up of the housing swelled symmetrically with the axis.

Due to the housing swelled symmetrically with the axis, the flow of the dry gas within the housing can be a circular flow along the circumference and, thus, the dry gas can flow from the outside to the central side of the bundle of the hollow fiber membranes accommodated within the housing. Accordingly, the dry gas collides with the bundle of the hollow fiber membranes and disturbed to be a turbulent flow. As a result, the dry gas uniformly flows on the external surface of the bundle of the hollow fiber membranes accommodated within the housing and thus, the moisture recovery (humidified amount) becomes large where the dry gas having a low moisture content recovers the moisture (water) from the moist gas having a large moisture content.

The humidifier according to the second aspect of the present invention can be suitably used as the humidifier in a fuel cell system.

According to the second aspect of the present invention, there is also provided a humidification process utilizing a hollow fiber membrane module comprising a plurality of water-permeable hollow fiber membranes placed along the lengthwise direction of a housing accommodated within the housing, in which gases each having a different moisture content flow inside and outside said hollow fiber membranes to carry out moisture exchange whereby the dry air having a low moisture content is humidified, said process comprising generating a turbulent flow of the gas flowing outside said hollow fiber membranes within the inner surface of the housing.

By generating a turbulent flow of the gas flowing outside said hollow fiber membranes within the inner surface of the housing, since the dry gas rectified along the inner surface to be laminar flow collides with the construction for generating a turbulent flow to be a turbulent flow, the dry air thoroughly flows over the external surface of the bundle of hollow fiber membranes. Accordingly, the moisture recovery (humidified amount) becomes large where the dry gas having a low moisture content recovers the moisture (water) from the moist gas having a large moisture content.

(Third Aspect)

According to the third aspect of the present invention which can attain these and other objects, there is provided a humidifier having a plurality of water-permeable hollow fiber membranes placed along the lengthwise direction of a housing accommodated within the housing in which gases each having a different moisture content flow inside and outside said hollow fiber membranes to carry out moisture exchange whereby the dry air having a low moisture content is humidified, said humidifier having a construction for generating a turbulent flow provided within the hollow fiber membranes.

By providing the construction for generating a turbulent current within the hollow fiber membranes, the gas whose moisture distribution is uniform flows within the inner surface of the hollow fiber membrane. Consequently, in comparison with the laminar flow, the difference in the moisture contents between the gas inside the hollow fiber membrane and the gas flowing outside the hollow fiber membrane near the gas inside the hollow fiber membrane can take a large. Accordingly, the water-permeability from the moist gas to the dry gas can be enhanced. Either the moist gas or the dry gas may flow inside the hollow fiber membrane. In any case, the gas flows as a turbulent flow to enhance the water-permeability. In the following embodiments, the humidifier in which the off gas, which is a moist gas in the fuel cell flows inside the hollow fiber membrane is exemplified.

In this humidifier according to the third aspect, the construction for generating a turbulent flow is projections provided on the inner surface of the hollow fiber membrane.

By providing the projection(s) on the inner surface of the hollow fiber membrane, the gas can be collided with the projection(s) to form a turbulent flow As a result, the gas having a uniform moisture distribution flows inside of the hollow fiber membrane and thus, the water-permeability from the moist gas to the dry gas can be enhanced.

In this humidifier according to the third aspect, the construction for generating a turbulent flow is a twisted fin provided at an inlet portion for introducing the gas into the interior of the hollow fiber membrane.

By providing a twisted fin at an inlet portion for introducing the gas into the interior of the hollow fiber membrane and stirring the gas flowing inside the hollow fiber membrane, the gas flows as a turbulent flow. As a result, the gas having a uniform moisture distribution flows inside of the hollow fiber membrane and thus, the water-permeability from the moist gas to the dry gas can be enhanced.

In this humidifier according to the third aspect, the construction for generating a turbulent flow is a step provided at an inlet portion for introducing the gas into the interior of the hollow fiber membrane.

By providing a step at an inlet portion for introducing the gas into the interior of the hollow fiber membrane and stirring the gas flowing inside the hollow fiber membrane, the gas flows as a turbulent flow. As a result, the gas having a uniform moisture distribution flows inside of the hollow fiber membrane and thus, the water-permeability from the moist gas to the dry gas can be enhanced.

The humidifier according to the third aspect of the present invention can be suitably used as the humidifier in a fuel cell system.

According to the third aspect of the present invention, there is provided a humidification process utilizing a hollow fiber membrane module comprising a plurality of water-permeable hollow fiber membranes placed along the lengthwise direction of a housing accommodated within the housing, in which gases each having a different moisture content flow inside and outside said hollow fiber membranes to carry out moisture exchange whereby the dry air having a low moisture content is humidified, said process comprising generating a turbulent flow of the gas flowing inside said hollow fiber membranes within said hollow fiber membranes.

By generating a turbulent flow of the gas flowing inside said hollow fiber membranes within said hollow fiber membranes, the gas whose moisture distribution is uniform flows within the inner surface of the hollow fiber membrane. Consequently, in comparison with the laminar flow, the difference in the moisture contents between the gas inside the hollow fiber membrane and the gas flowing outside the hollow fiber membrane near the gas inside the hollow fiber membrane can take a large. Accordingly, the water-permeability from the moist gas to the dry gas can be enhanced. Either the moist gas or the dry gas may flow inside the hollow fiber membrane. In any case, the gas flows as a turbulent flow to enhance the water-permeability. In the following embodiments, the humidifier in which the off gas, which is a moist gas in the fuel cell flows inside the hollow fiber membrane is exemplified.

BRIEF DESCRIPTION OF THE DRAWINGS

FIG. 10A is a perspective view showing the configuration of the second aspect of the present invention, FIG. 10B is a perspective view of the hollow fiber membrane module of the second aspect of the present invention, and FIG. 10C is an enlarged view of FIG. 10B.

DESCRIPTION OF THE PREFERRED EMBODIMENTS

Figure 1:
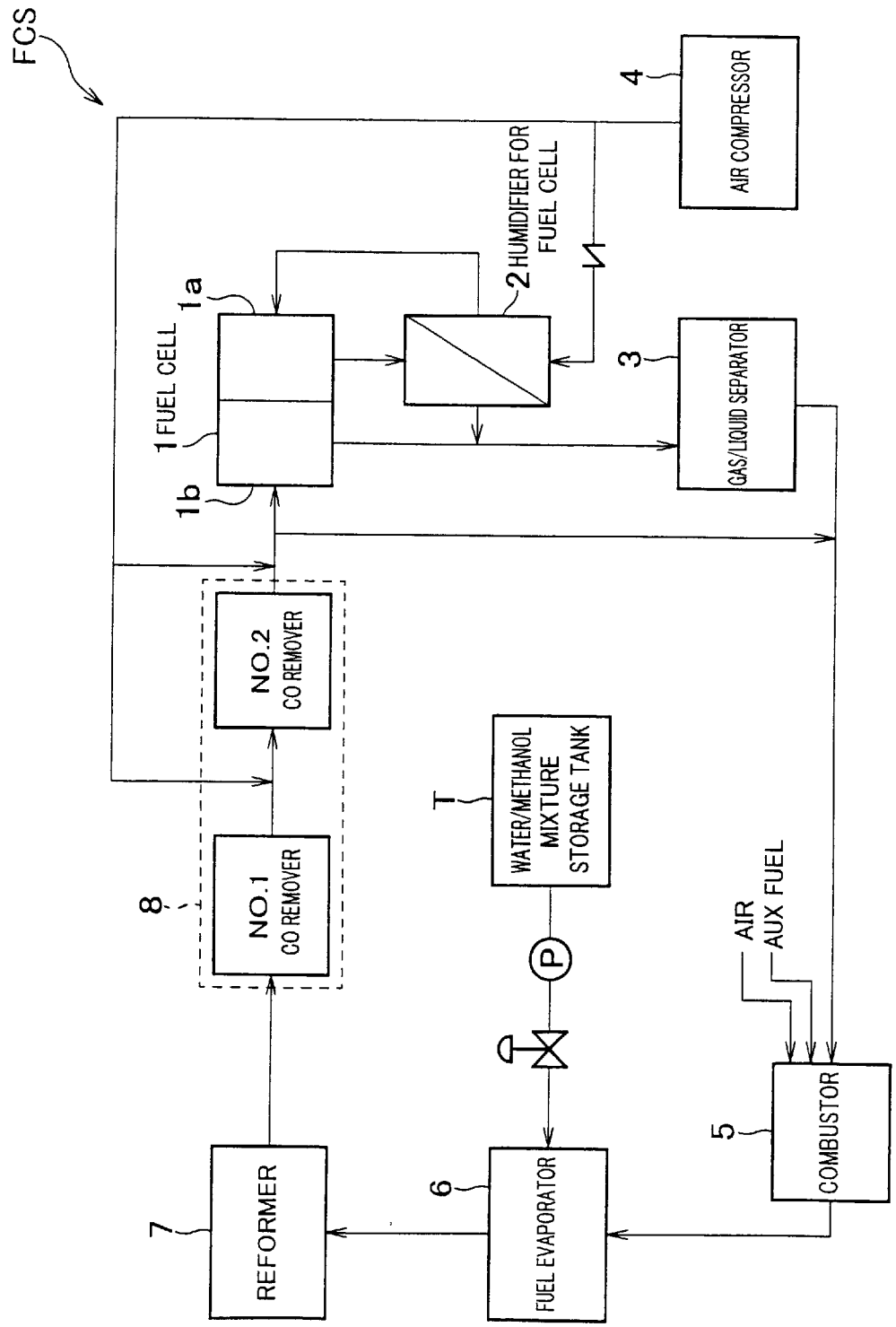
FIG. 1 is a drawing totally showing the fuel cell system.

The embodiments of the present invention will now be described by referring to the drawings.

(First Aspect)

By referring to FIG. 1, the total configuration of the fuel cell system and the functions thereof will now be described.

Fuel cell system FCS is comprised of a fuel cell (stack) 1, a humidifier 2, a gas/liquid separator 3, an air compressor 4, a combustor 5, a fuel evaporator 6, a reformer 7, a CO remover 8, water/methanol mixed solution storage tank T (hereinafter simply referred to as "tank"), and the like.

In the fuel cell 1, humidified air as an oxidant gas is supplied to an oxygen pole side $1a$ and hydrogen-enriched gas as a fuel gas is supplied to a hydrogen pole side $1b$. The fuel cell 1 takes an electric energy from the chemical energy brought about due to the chemical reaction between oxygen and hydrogen to generate a power. The humidified air is brought about by compressing atmospheric air (air), which is compressed by the air compressor 4, and then humidifying the compressed air in the humidifier 2. The humidification of the dry air is carried out through the moisture-exchange between the off gas which contains a relatively large amount of water discharged out of the oxygen pole $1a$ and the dry air which has a relative small water content, and the details of which will be described later on. The fuel gas occurs when the mixed liquid of water and methanol, which is a raw fuel liquid, is evaporated in the fuel evaporator 6, and reformed in the reformer 7, followed by the removal of carbon monooxide (CO) in the CO remover 8. The raw fuel liquid stored in the tank T is metered through a pump P to the fuel evaporator 8 at which the liquid fuel is evaporated and mixed with air for the reformation to provide a raw fuel gas, the resulting raw fuel gas is supplied to the reformer 7, and then to the CO remover 8 at which CO is removed. In the reformer 7, methanol is steam-reformed and partially oxidized in the presence of a catalyst. In the CO remover 8, CO is selectively oxidized in the presence of a catalyst to be converted into $CO_2$. In order to quickly remove decrease the concentration of carbon oxide, the CO remover is composed of two CO removers, i.e., No. 1 CO remover and No. 2 CO remover. The air compressor 4 supplies air for the selective oxidation to the CO remover 8.

The off gas containing a large amount of the produced water at the oxygen pole side $1a$ and the off gas containing hydrogen remaining unreacted at the hydrogen pole side $1b$ occur at the same time. The off gas at the oxygen pole side $1a$ is used for the humidification of the air in the humidifier 2 as described above, after which it is mixed with the off gas at the hydrogen pole side $1b$, and the water contained therein is removed through the gas/liquid separator 3. Consequently, the off gas from which the water is removed (mixed off gas) is combusted in the combustor 5, and is used as a heat source for the fuel evaporator 6. It is noted that an auxiliary fuel (methanol etc.) and air are supplied to the combustor 5 in order to supply a deficient calorie and to warm up the fuel cell system FCS at starting.

Figure 2:
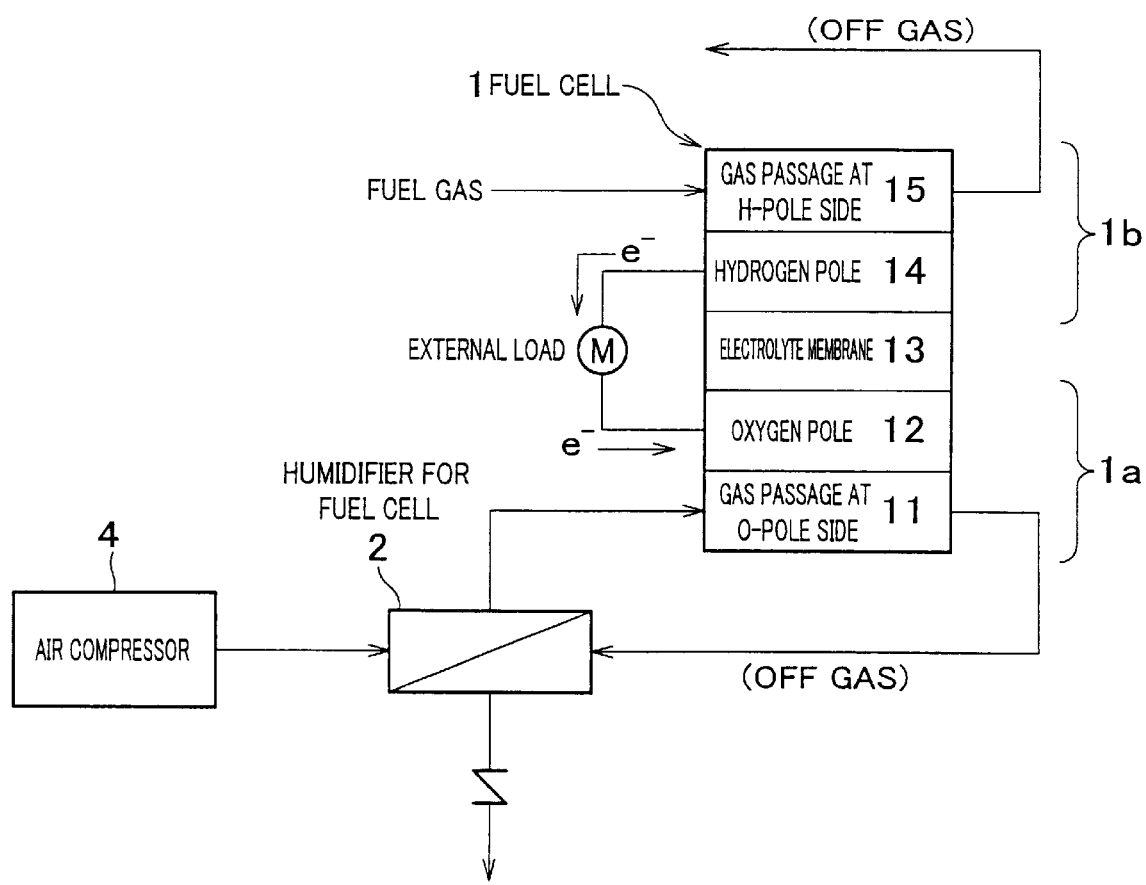
FIG. 2 is an explanative view outlining the configuration of the fuel cell system.

The configuration and functions of the fuel cell will now be described by referring to FIG. 2. In FIG. 2, the fuel cell 1 is expressed as a single cell in order to simplify the configuration. (Actually, the fuel cell 1 is configured as to be a laminate having approximately 200 single cells laminated).

As shown in FIG. 2, the fuel cell 1 is divided into the hydrogen pole side $1b$ and the oxygen pole side $1a$ across a electrolyte membrane 13, and each of the poles has an electrode containing a platinum series catalyst to form a hydrogen pole 14 and an oxygen pole 12. In this figure, the diffusion layer is omitted. The hydrogen-enriched gas occurring from the raw fuel liquid is passed through a gas passage 15 at the hydrogen pole side as the fuel gas, while the humidified air humidified in the humidifier 2 is passed through a gas passage 15 at the oxygen pole side as the oxidant gas. As electrolyte membrane 13 which can be used herein, a solid macromolecular membrane, such as perfluorocarbon sulfonic acid, which is a proton-exchange membrane, has been known. The electrolyte membrane 13 has a plurality of proton-exchanging groups in the solid macromolecule, and has a low specific resistance lower than 20 Ù-proton at a normal temperature, when being saturated with water, serving as a proton-conductive electrolyte. Consequently, the protons produced by the ionization of hydrogen in the presence of the catalyst are easily migrated in the electrolyte membrane 13, and reach the oxygen pole 13, at which the protons are readily reacted with the oxygen ions produced from the humidified air in the presence of the catalyst to produce water. The produced water is discharged from an outlet residing at the oxygen pole side 1a of the fuel cell 1 as a moist off gas together with humidified air. At the time of the ionization of hydrogen, electrons e⁻ are produced in the hydrogen pole 14. The produced electrons e⁻ reach the oxygen pole 14 via an external load M such as a motor.

The reason why the humidified air is supplied to the fuel cell 1 as an oxidant gas is that power generation efficiency is decreased due to the lowered proton conductivity in the electrolyte membrane 13 if the electrolyte membrane 13 is dried. On the other hand, if the electrolyte membrane 13 is humidified in excess, the electrodes, the diffusion layers as such (typically at the oxygen pole side). Consequently, in the fuel cell system FCS utilizing the solid macromolecular type fuel cell 1, the humidification is of important meanings. The raw fuel liquid contains a large amount of water, which is used for the purpose of humidifying the hydrogen pole side 1b in addition to the reformation of the methanol in the raw fuel liquid.

[Humidifier: First Embodiment]

Subsequently, the humidifier 2 according to the first embodiment (among the first aspect) of the present invention will now be described by referring to FIGS. 3 to 6. In FIGS. 3 to 9, the current of the off gas which is "the gas flowing inside the hollow fiber membranes" is depicted as a white arrow, and the dry air (humidified air) which is "the gas flowing outside the hollow fiber membranes" is depicted as a black arrow.

Figure 3A:
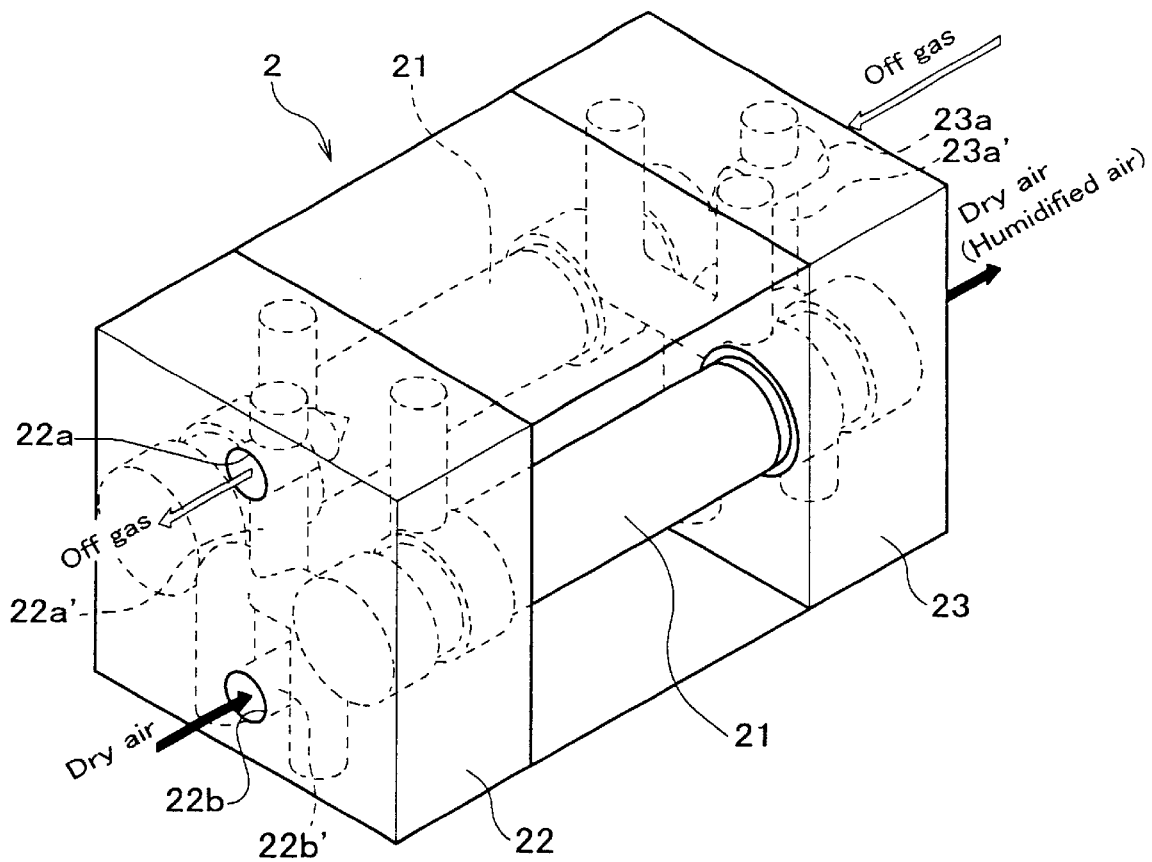
FIG. 3A is a perspective view of the humidifier according to the present invention.

As shown in FIG. 3A, the humidifier 2 according to the first embodiment possesses two parallel hollow fiber membrane modules 21 and 21 each having a substantially cylindrical shape, a boxy distributor 22 at one end and a boxy distributor 23 at another end. The humidifier 2 is totally confabulated to have a rectangular parallelepiped form. These two hollow fiber membrane modules 21 and 21 are placed at a predetermined space in parallel and fixed by means of the distributors 22 and 23 at both ends. In each of two hollow fiber membrane modules 21 and 21, the dry air is supplied and the wet off gas is discharged via the distributor 22 at one end, and the humidified air in which the dry air is humidified is discharged and the off gas is supplied via the distributor 23 at another end.

Figure 3B:
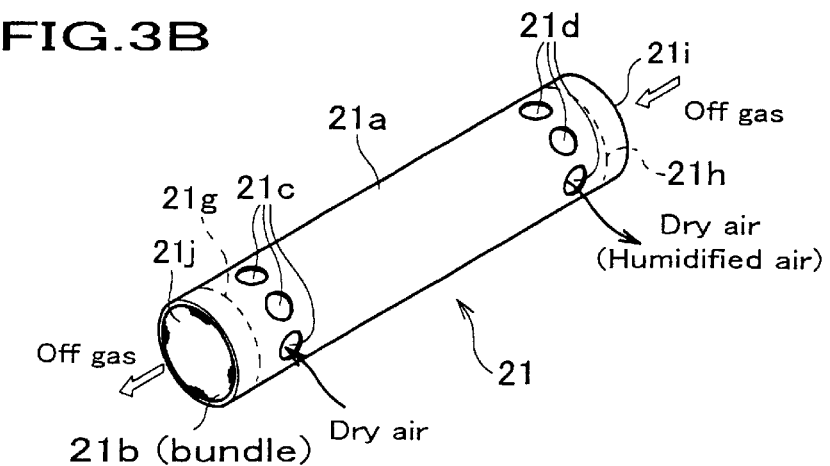
FIG. 3B is a perspective view of the hollow fiber membrane module.
Figure 4A:
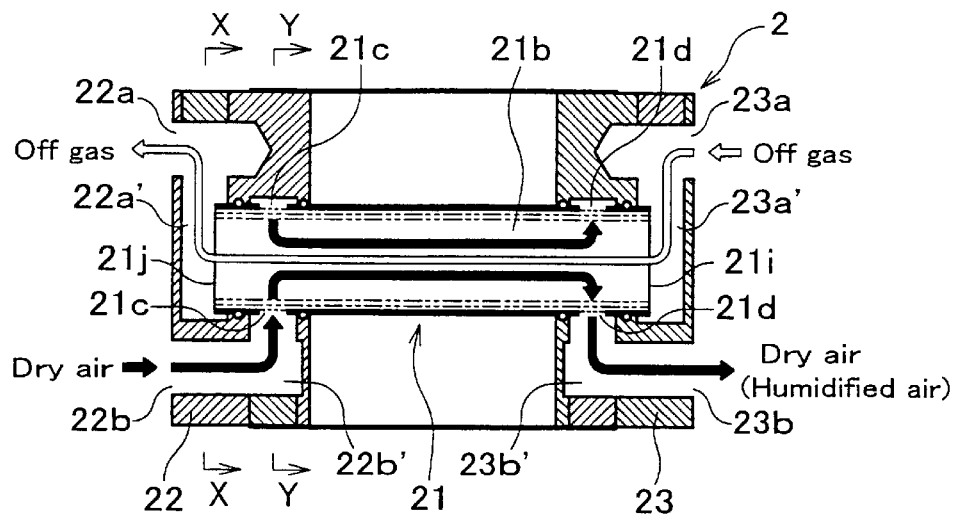
FIG. 4A is a side cross-sectional view of the humidifier according to the present invention.
Figure 4B:
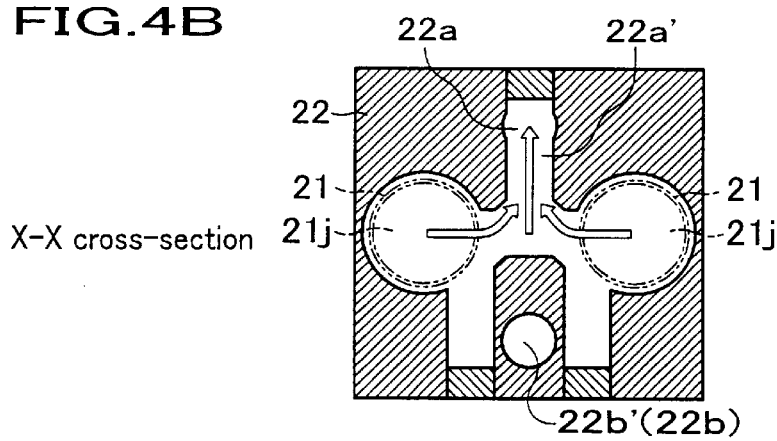
FIG. 4B is a cross-sectional view taken along the line X—X of FIG. 4A.
Figure 4C:
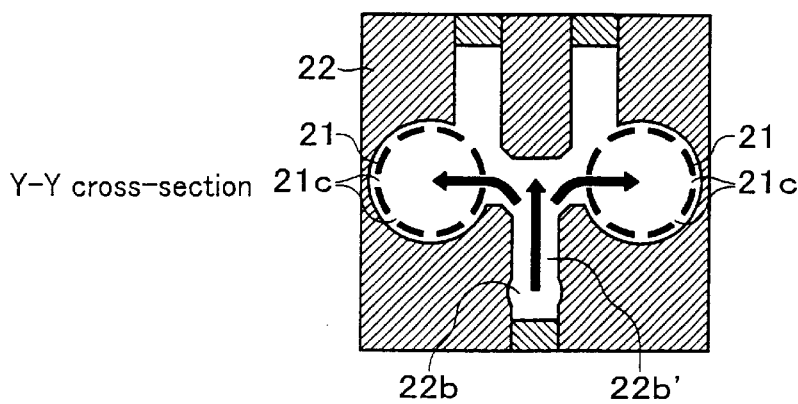
FIG. 4C is a cross-sectional view taken along the line Y—Y of FIG. 4A.
Figure 5:
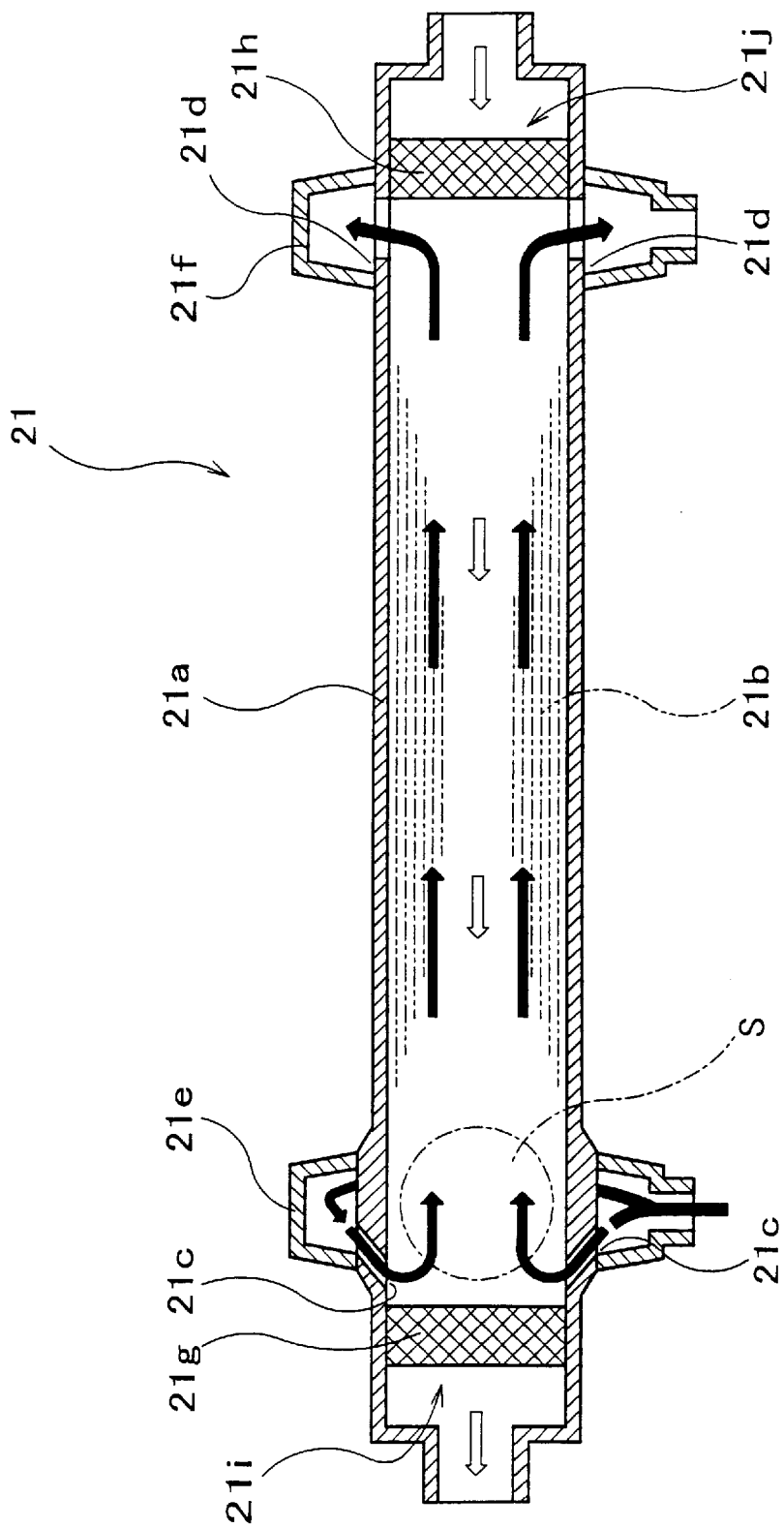
FIG. 5 is a side cross-sectional view of the humidifier according to the first embodiment of the present invention.

As shown in FIG. 3, the hollow fiber membrane module 21 possesses a housing 21a. As shown in FIGS. 4 and 5, the bundle 21b of the hollow fiber membranes composed of water-permeable hollow fiber membranes bundled with each other placed along the lengthwise direction thereof is accommodated within the housing 21b. The hollow fiber membrane has a plurality of capillaries with a diameter of several nm from inside to outside. In the capillary, the vapor pressure is decreased whereby the condensation of the water easily occurs. The condensed water is drawn up due to the capillary phenomenon and the water is permeated through the hollow fiber membrane.

The housing 21a has a hollow cylindrical form both ends of which are opened. At one end of the housing 21a in the lengthwise direction, eight (8) inlets 21c, 21c, . . . for introducing the dry air are formed at interval in the circumferential direction. At another end of the housing 21a in the lengthwise direction, eight (8) outlets 21d, 21d, . . . for the humidified air are formed at interval in the circumferential direction. As shown in FIG. 5, the inlets 21c, 21c formed as described above is formed directionally to one end of the housing 21b in the lengthwise direction to makes up a nozzle having a function of an injector which injects the dry air. Specifically, in this embodiment, the inlets 21c, 21c, . . . for introducing the dry air make up a nozzle serving as an injector of the present invention.

Figure 6:
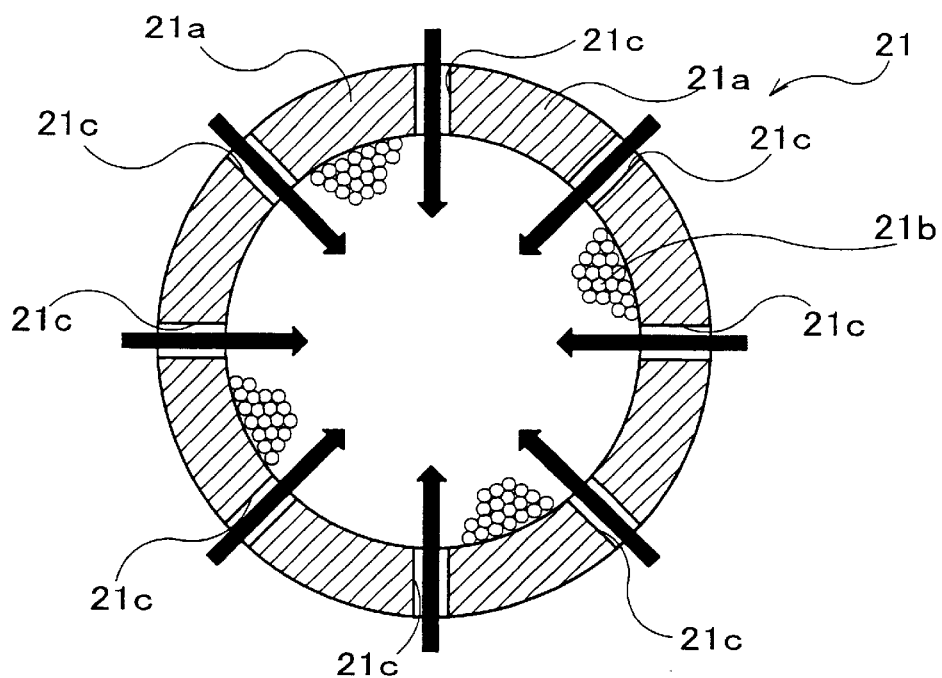
FIG. 6 is a longitudinally cross-sectional view of the inlet portion for the dry air flow of the hollow fiber membrane module according to the first embodiment of the present invention.

As shown in FIG. 6, the outlets 21d, 21d, . . . for the humidified air are formed along the radius of the housing 21a. Consequently, the dry gas introduced from these inlets 21c, 21c, . . . is injected at the center axis of the housing 21a.

As shown in FIG. 5, the inlets 21c, 21c, . . . for introducing the dry air formed at one end of the housing 21a in the lengthwise direction are communicated with the interior of a ring member 21e, which surrounds one end of the housing 21a in the circumferential direction. The dry air flowing within the ring member 21e is distributed to each inlet 21c, 21c . . . for the dry air, and the distributed air is introduced into the housing 21a from each inlet 21c.

Furthermore, the outlets 21d, 21d, 21d . . . for the humidified air formed at another end of the housing 21a are communicated with the interior of a ring member 21f, which surrounds another of the housing 21a in the circumferential direction. The humidified air discharged out of the outlets 21d, 21d, 21d . . . for the humidified air is collected in the ring member 21f, and then discharged.

On the other hand, the bundle 21b of the hollow fiber membranes accommodated within the housing 21a composed of is potted in such a manner that plurality of (e.g., several thousands of) water-permeable hollow fiber membrane each having hollow passage are bundled, and a potting portion 21g at one end and a potting portion 21h at another end are provided for potting the hollow fiber membranes. The potting portion 21g at one end resides at the portion somewhat nearer than the end than the position where the inlets 21c, 21c, 21c . . . for the dry air. Consequently, in this embodiment, the portion sandwiched between the potting portions 21g and 21f substantially makes up the housing referred to the present invention. The term "end in the lengthwise direction of the housing" used in the present invention resides at the somewhat inner portion in the lengthwise direction relative to the position where the potting portion 21g is formed. Typically, the positions where the inlets 21c, 21c, 21c . . . for the dry air are formed are preferably positions within 10 cm, desirably within 5 cm, more desirably 3 cm, from the position where the potting portion 21g is formed. Of course, it is possible the potting portion 21g may be in contact with the inlets 21c, 21c, 21c . . . for the dry air.

An outlet 21i for the off gas flow is formed outside the potting portion 21g, while an inlet 21 for the off gas is formed further outside the potting portion 21h. As described above, in the case where the potting portions 21g and 21h are separated, the inlet 21j and the outlet 21i for the off gas flow are communicated with the inside of each hollow fiber membrane making up the bundle 21b of the hollow fiber membranes, and the outside of the each hollow fiber membrane, the inlet 21j and the outlet 21i are kept gastightly. By such a configuration as described above, the off gas which flows through the hollow passage, which is within the hollow fiber membrane is not mixed with the dry air flowing outside the hollow fiber membrane. In addition, the off gas introduced from the inlet 21j is distributed into each hollow fiber membrane at the position outside the potting portion 21h, while the off gas discharged from each hollow fiber membrane is collected at the position outside the potting portion 21g. The hallow fiber membrane module 21 configured as described above is formed by inserting a predetermined number of the hollow fiber membranes into the housing 21a, thoroughly fixing the portions near both end surfaces with an adhesive to form the potting portions 21g and 21f, cutting the bundle of hollow fiber membranes along both ends of the housing 21a.

The distributor 22 at one end and the distributor 23 at another end fix two hollow fiber membrane modules 21 and 21 in a predetermined positional relation. The distributor 22 at one end possesses the outlet 22a of the off gas and the inlet 22b for the dry air. As shown in FIGS. 4A and 4B, the outlet 22a for the off gas is communicated with the outlet 21i for the off gas flow by means of an inner passage 22a' placed inside the distributor 22a at one end. As shown in FIGS. 4A and 4C, the inlet 22b for the dry air is communicated with inlets 21c, 21c, . . . for the dry air by means of an inner passage 22b' placed at the side of the distributor 22a at one side.

On the other hand, an inlet 23a for the off gas and an outlet 23b for the humidified air are formed on the distributor 23 at another end. The inlet 23a for the off gas is communicated with the inlet 21j for the off gas flow possessed by the hollow fiber membrane modules 21 and 21 by means of an inner passage 23a' placed inside the distributor 23 at another end. The outlet 23b for the humidified air is communicated with the outlets 21d, 21d, 21d . . . for the dry air formed at another end of the hollow fiber membrane modules 21 and 21 by means of an inner passage 23b' placed inside the distributor 23 at another end.

By packaging the hollow fiber membrane modules 21 and 21 as described above, the humidifier 2 can be produced in a small size while securing easy handling.

[Functions]

Next, the functions of the humidifier 2 will be described by referring to FIGS. 3 to 6.

The off gas shown as the white arrow, which is the moist gas flows in the humidifier 2 from the inlet 23a for the off gas possessed by the distributor 23. The off gas introduced into the distributor 23 is passed through the inner passage 23a', and reaches the inlet 21j for the off gas flow of the hollow fiber membrane module 21. The off gas flowing within the housing 21a via the inlet 21j for the off gas flow is branched to each of the hollow fiber membranes in the bundle 21b of the hollow fiber membranes, and passed through the interior of each hollow fiber membrane. The off gas exiting the interior of each hollow fiber membrane flows out from the outlet 21i for the off gas flow. The off gas thus discharged flows within the inner passage 22a' of the distributor 22a, and then combined. The combined off gas reaches the outlet 22a for the off gas and is discharged from the outlet 22a, and then flows toward the later gas/liquid separator 3.

On the other hand, the dry air shown as the black arrow, which is the dry gas enters the humidifier 2 from the inlet 22b for the dry air, is passed through the inner passage 22b' to be distributed, and is introduced into the ring member 21e shown in FIG. 5 provided on one side of the hollow finer membrane modules 21 and 21. The dry air thus introduced flows within the ring member 21e, distributed into the inlets 21c, 21c, . . . for the dry air, and then introduced into the housing 21a. The dry air introduced into the housing 21a flows outside the hollow fiber membranes. At this time, the dry air flows outside the hollow fiber membranes, while off gas flows inside the hollow fiber membranes, and the moisture from the off gas is separated by the hollow fiber membrane. By the separated moisture, the dry air flowing outside the hollow fiber membranes is humidified to produce humidified air.

More specifically, the off gas containing a large amount of moisture (high moisture content) flows within the hollow fiber membrane and the dry air having a relatively low moisture content flows outside the hollow fiber membrane. Meanwhile, the moisture is condensed at the inside of the hollow fiber membrane is condensed, while the water is evaporated at the outside of the hollow fiber membrane by means of the dry air. Simultaneously, the moisture from the off gas condensed inside is supplied from the inside to the outside due to the capillary phenomenon. Specifically, the moisture permeation (water separation) takes place in the hollow fiber membrane on account of the difference between the moisture contents of the gases flowing inside and outside the propulsive power.

The humidified air thus obtained exits the outlets 21d, 21d, 21d . . . for the humidified air, and reaches the ring member 21f. The humidified air reaching the ring member 21f is discharged toward the inner passage 23b' of the distributor 23 as shown in FIG. 4A. At the inner passage 23b', the humidified air discharged from each of the hollow fiber modules 21 and 21 is combined, the combined humidified air flows toward the outlet 23b for the humidified air, after which it is supplied into the later gas/liquid separator 3.

The moisture exchange is carried out as described above. As shown in FIG. 5, in the present invention, the inlets 21c, 21c, . . . for introducing the dry air into the housing 21a are formed at one end in the lengthwise direction of the housing 21a. For this reason, the dry air can be introduced into the housing 21a even at the end portions. What is more, the inlets 21c, 21c, 21c . . . for the dry air also severs as a nozzle formed directly toward one end of the lengthwise direction.

For this reason, as shown in FIG. 5, the dry air introduced from the inlets 21c, 21c, 21c . . . for the dry air is injected toward the potting portion 21g placed at one end of the housing 21a. Consequently, the dry air can be spread to an area S at one end of the housing 21a in a much more preferable manner, making it possible to carry out the moisture exchange even at the area S in a sufficient manner. Furthermore, the dry air injected from the inlets 21c, 21c, 21c . . . for the dry air is directed towards the center of the axis of the bundle 21b of the hollow fiber membranes of the housing 21a. For this reason, the dry air can be sufficiently spread to the central portion of the axis of the bundle 21b of the hollow fiber membranes accommodated within the housing 21a, making it possible to carry out the moisture exchange even at the central portion of the axis of the bundle 21b of the hollow fiber membranes in a sufficient manner. As described above, since the moisture exchange can be carried out over the entire area of the bundle 21b of the hollow fiber membranes in the humidifier in this embodiment, the recovery of water can be enhanced.

[Second Embodiment]

Next, the second embodiment of the present invention will be described by referring to FIGS. 5 and 7.

Figure 7:
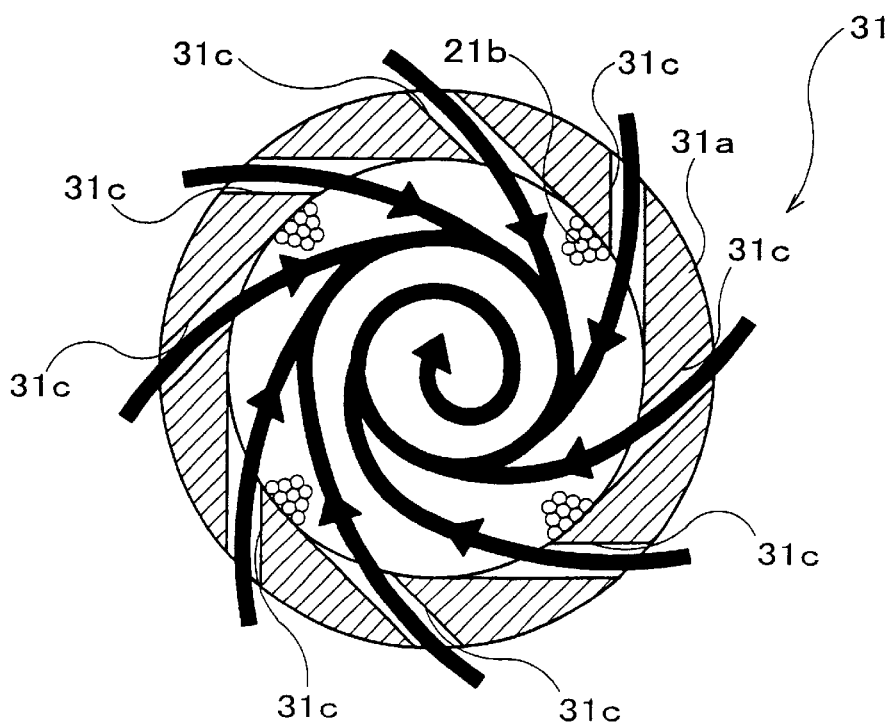
FIG. 7 is a longitudinally cross-sectional view of the inlet portion for the dry air flow of the hollow fiber membrane module according to the second embodiment of the present invention.

FIG. 7 is a cross-sectional view of the inlet portion of the dry gas flow of the hollow fiber membrane module according to the second embodiment. Since the side cross-sectional view of the hollow fiber membrane according to this embodiment is the same as that of the first embodiment shown in FIG. 5, the description is made by referring to FIG. 5 or is omitted. The humidifier according to this embodiment has the same configuration as that of the first embodiment, except for the inlet for the dry gas flow. For this reason, only the inlet for the dry gas flow will be described and the description of any other configuration will be omitted.

In the first embodiment, the eight (8) inlets 21c, 21c, . . . for introducing the dry air are formed in such a manner that they exist along the radius of the housing 21a.

As shown in FIGS. 5 and 7, in this embodiment, eight (8) inlets 31c, 31c, . . . for introducing the dry air (corresponding to 21c in FIG. 5), so as to make a circular flow are formed directionally to one end of the housing 31a, similar to the case of the first embodiment. However, as different from the first embodiment, the eight (8) inlets 31c, 31c, . . . for the dry air are slanted to the radius direction in this embodiment. It is noted that the inlets 31c, 31c, . . . for introducing the dry air makes up the inlet and at the same time the injector and the generator which generate a circular flow.

In this embodiment, by forming the inlets 31c, 31c, . . . for the dry air slanted to the radius direction, the dry air injected from the inlets 31c, 31c, . . . for the dry air serving as the nozzle into the housing 31a becomes a circular flow in the housing 31a as shown in FIG. 7. In the case where the dry air is injected as a circular air, it is possible to make the dry air turbulent flow. By subjecting the dry air to the turbulent flow, the dry air can be spread over the entire space within the housing over a prolonged period of time. This contributes to the improvement in the recovery of water since the moisture exchange suitably takes place.

The dry air introduced as the turbulent flow also flows outside the hollow fiber membranes accommodated within the housing when it flows in the housing and, at the same time, is humidified with the moisture from the off gas flowing within the hollow fiber membranes to be the humidified gas. The humidified gas is discharged from the outlet for the humidified gas flow, and then supplied to the later gas/liquid separator 3 shown in FIG. 1.

[Third Embodiment]

Subsequently, the third embodiment of the present invention will be described. Similar to the second embodiment, the humidifier according to this embodiment has the same configuration as that of the first embodiment, except for the inlet for the dry gas flow. For this reason, only the inlet for the dry gas flow will be described and the description of any other configuration will be described using the same symbols as those in the first embodiment.

Figure 8:
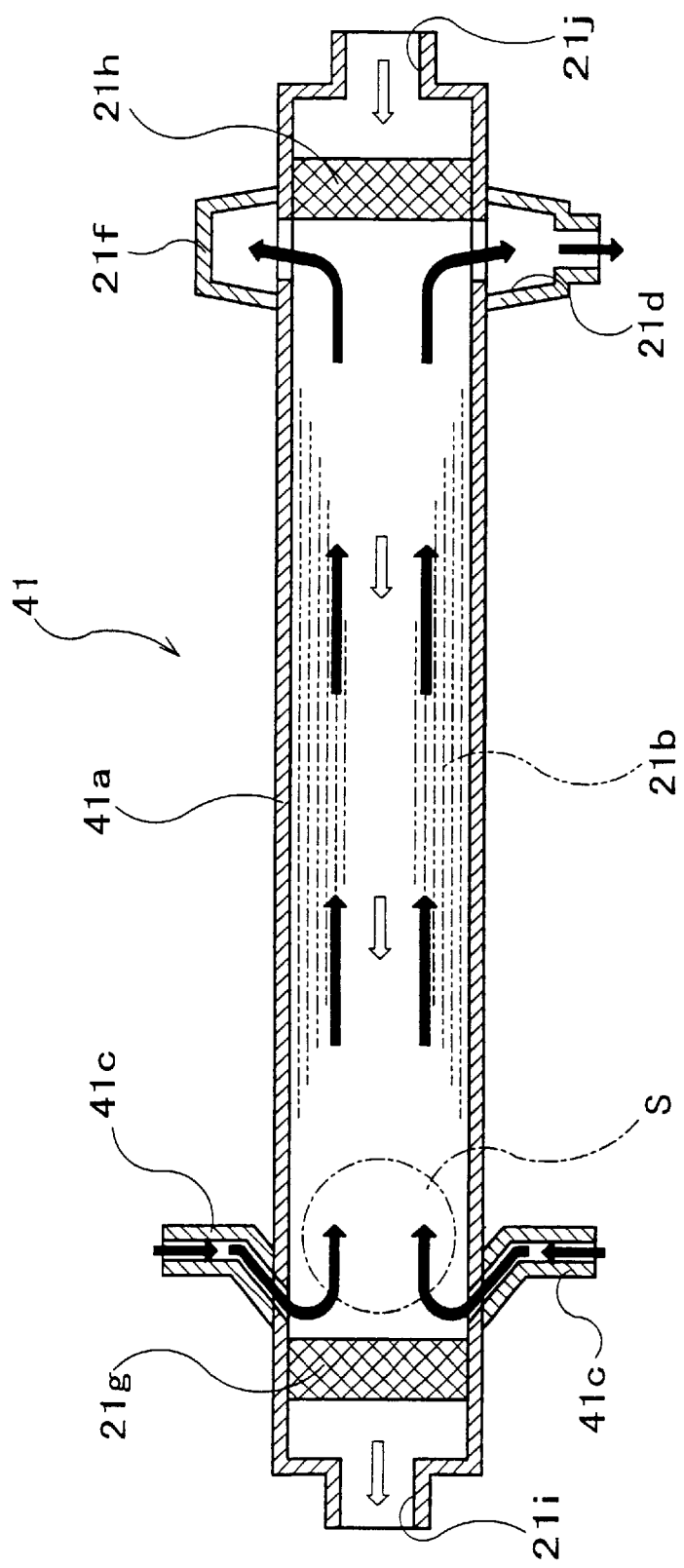
FIG. 8 is a longitudinally cross-sectional view of the inlet portion for the dry air flow of the hollow fiber membrane module according to the third embodiment of the present invention.

As shown in FIG. 8, in the hollow fiber membrane module 41 according to this embodiment, injection holes 41c and 41c are formed as the inlets for the dry gas flow at one end thereof. These injection holes 41c and 41c are communicated with the inner passage 22b' of the distributor 22 at the inlet side shown in FIGS. 3 and 4.

The dry air directly supplied from the inner passage 22b' to the injection holes 41c and 41c is injected toward one end within the housing 41a from the injection holes 41c and 41c.

As described above, by injecting the dry air toward one end of the housing 41a, the dry air can be spread to one end within the housing. Consequently, since the moisture exchange can be sufficiently carried out even at the end of the housing 41a, the moisture recovery can be enhanced.

[Fourth Embodiment]

Subsequently, the fourth embodiment of the present invention will be described. Similar to the second and third embodiments, the humidifier according to this embodiment has the same configuration as that of the first embodiment, except for the inlet for the dry gas flow. For this reason, only the inlet for the dry gas flow will be described and the description of any other configuration will be described using the same symbols as those in the first embodiment.

Figure 9:
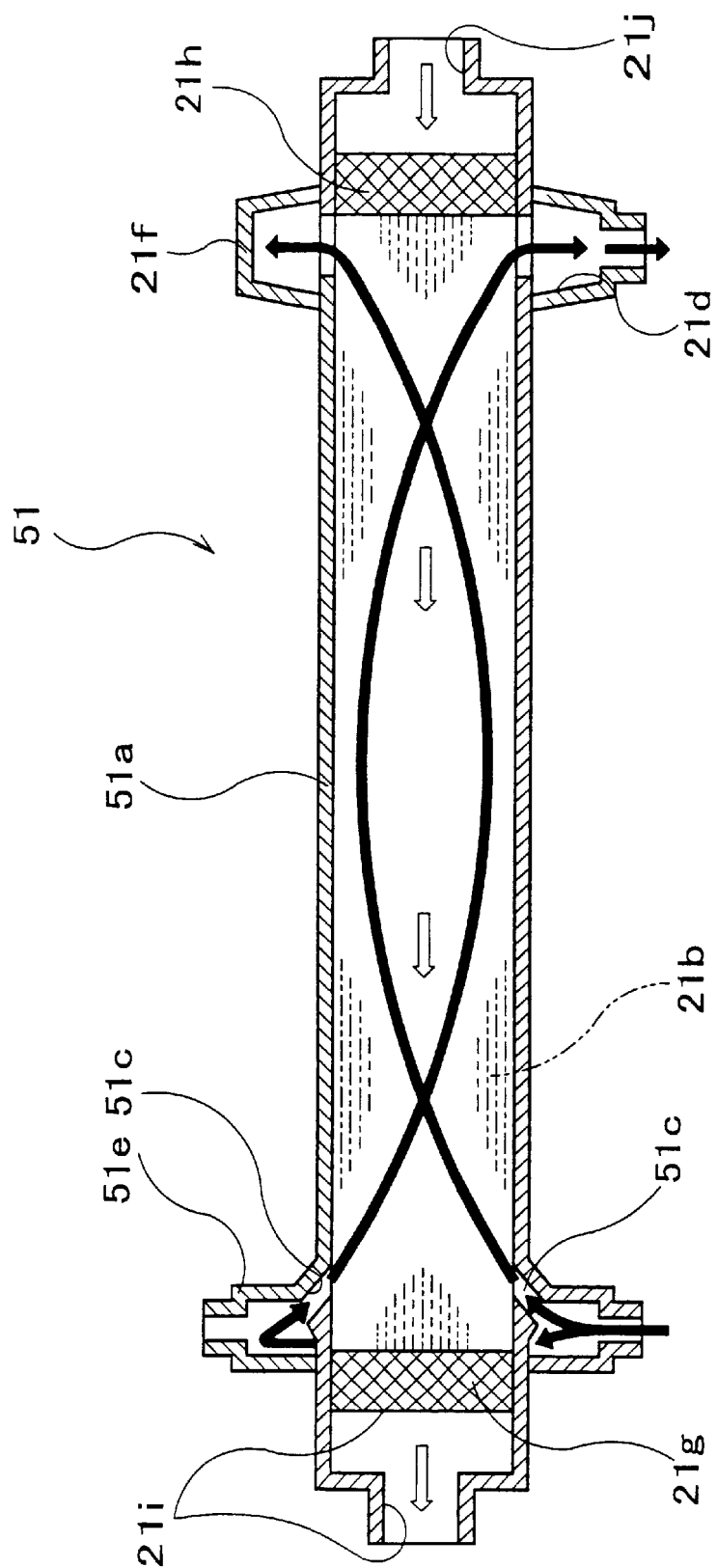
FIG. 9 is a longitudinally cross-sectional view of the inlet portion for the dry air flow of the hollow fiber membrane module according to the fourth embodiment of the present invention.

As shown in FIG. 9, the hollow fiber membrane module 51 according to this embodiment has a housing 51a, and inlets 51c and 51c . . . for the dry air are formed on one end of the housing 51a. The inlets 51c and 51c . . . for the dry air make up a nozzle, which injects the dry air to the central portion in the lengthwise direction of the housing 51a. The inlets 51c and 51c . . . for the dry air thus formed are communicated with the interior of a ring member 51e, which surrounds one end of the housing 51a in the circumferential direction. The dry air flowing within the ring member 51e is distributed to each inlet 51c, 51c . . . for the dry air, and the distributed air is introduced into the housing 51a from each inlet 51c.

In this embodiment, the dry air is injected from the inlets 51c, 51c . . . for the dry air to the central portion in the lengthwise direction of the housing 51a. For this reason, since the dry air can flow over the entire area of the housing 51a inclusive of the end portions in this embodiment, the moisture exchange can be carried out over the entire area within the housing, resulting in an enhanced recovery of water.

While the invention has been described in detail and with reference to specific embodiments thereof, it will be apparent to one skilled in the art that various changes and modifications can be made therein without departing from the spirit and scope thereof. In the preferred embodiments, the dry air (humidified air) and the off gas flow through the hollow fiber membrane module in a counter-flow fashion. However, the dry air (humidified air) and the off gas may flow parallelly.

Counter-flowing the dry air and the off gas is advantageous because the humidity concentration difference within the hollow fiber membranes can be equalized and thus the water permeability thereof can be improved. Further, opposing layout of the gas inlet and the gas outlet facilitates arrangement of the gas conduit. Further, because heat exchanger effectiveness through the hollow fiber membrane is improved, cooling performance of the gas is improved. Furthermore, because of the higher heat exchanger effectiveness, the outlet temperature of the dry air is easily adjustable to the outlet temperature of the off gas, and thereby the temperature adjustment is facilitated. This facilitates management of the humidity of the air supplied to the fuel cell.

Temperature adjustment function of the humidifier will be described additionally.

For example, the dry air compressed by an air compressor such as a supercharger changes its temperature in the range of approximately from 30° C. (when idling the fuel cell) to 120° C. (at the maximum output of the fuel cell). Meanwhile, the fuel cell is operated at a temperature of approximately 80° C. under control of the temperature, and the off gas is discharged at a temperature of 80° C. and a little more. When flowing this off gas and the dry air compressed by the air compressor into the humidifier, thermal transfer as well as moisture transfer occurs through the hollow fiber membrane. As a result, the dry air is supplied to the fuel cell as a humidified air having a temperature close to the off gas that is a stable temperature close to the operating temperature of the fuel cell. In other words, when the output of the fuel cell is lower, such as in the idling time, the dry air is humidified and heated through the humidifier and is supplied to the fuel cell, however, when the output of the fuel cell is higher, such as in the maximum output of the fuel cell, the dry air is humidified and cooled through the humidifier and is supplied to the fuel cell as a humidified air within a stable temperature range. Therefore, with the temperature adjustment function of the humidifier, the fuel cell is operated under appropriate temperatures, leading to increased generation efficiency.

Further, when an inter-cooler is mounted at an exhaust side of the air compressor, the dry air compressed by the air compressor is cooled or heated, and changes its temperature in the range of approximately from 50° C. (when idling the fuel cell) to 60° C. (at the maximum output of the fuel cell). If the dry air passing through the inter-cooler is flown through the humidifier, where the off gas (having a temperature of 80° C. and a little more) flows, the dry air is humidified and heat-adjusted (heated) through the hollow fiber membrane and is supplied to the fuel cell as a humidified air having a temperature close to the off gas that is a stable temperature close to the operating temperature of the fuel cell. Therefore, even if an inter-cooler is mounted, with the temperature adjustment function of the humidifier, the fuel cell is operated under appropriate temperatures, leading to increased generation efficiency.

Furthermore, while two hollow fiber membrane modules are used in these embodiments, one modules or three or more modules may of course be used. Also, while the off gas flows inside the hollow fiber membrane and the dry air flows outside the hollow fiber membrane, the off gas and the dry air flow outside and inside the hollow fiber membrane, respectively.

In the third and fourth embodiments, a generator for circular flow may be provided. Also, in these embodiments, no injector may be provided and the dry air may be merely introduced from the end of the housing.

If moisture condensation occurs in the hollow fiber membrane modules and the like at a part of the housing, where the dry air or the humidified air flows, the outer surface area of the hollow fiber membranes will not be used effectively. For this reason, the humidified air is preferably drained out from a bottom part of the hollow fiber membrane module so as to prevent moisture condensation within the housing. With this arrangement, because condensed moisture together with the humidified air is drained out from the housing, occurrence of moisture condensation can be prevented. Preferably, the drained water is collected by a catch tank or the like, and is reused in other systems.

(Second Aspect)

[Humidifier: Second Embodiment]

Figure 11A:
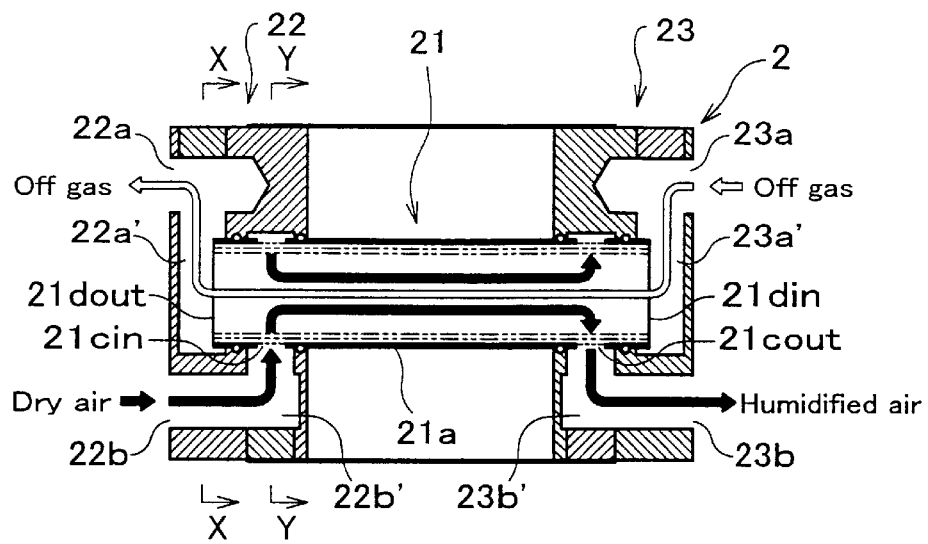
FIGS. 11A–C are cross-sectional view showing the flows of the gases within the humidifier according to the second aspect of the present invention.
Figure 11B:
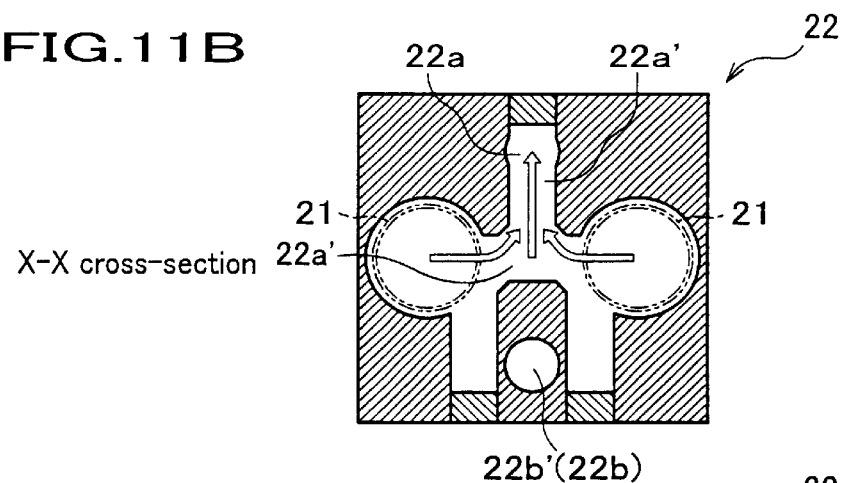

Subsequently, the humidifier 2 according to the second embodiment of the present invention will now be described by referring to FIGS. 10 and 11.

As shown in FIG. 10A, the humidifier 2 according to the second aspect possesses two parallel hollow fiber membrane modules 121 and 121 each having a substantially cylindrical shape, a boxy distributor 122 at one end and a boxy distributor 123 at another end. The humidifier 2 is totally confabulated to have a rectangular parallelepiped form.

These two hollow fiber membrane modules 121 and 121 are placed at a predetermined space in parallel and fixed by means of the distributors 122 and 123 at both ends. In each of two hollow fiber membrane modules 121 and 121, the dry air is supplied and the wet off gas is discharged via the distributor 122 at one end, and the humidified air in which the dry air is humidified is discharged and the off gas is supplied via the distributor 123 at another end.

As shown in FIG. 10B, the hollow fiber membrane module 121 possesses a housing 121a, and a bundle 121b of the hollow fiber membranes accommodated within the housing 121a. The housing 121a has a cylindrical shape both ends of which are opened.

The housing 121a is provided with a plurality of openings in close proximity to each end. In the illustrated embodiment, eight openings are provided along its peripheral direction. The bundle of hollow fiber membranes 21b is formed by binding several thousands to ten and several thousands of hollow fiber membranes HF, each of which has a hollow passage (FIG. 10B), in such a way that all the hollow fiber membranes HF are fixed with glue while retaining hollow passages at both ends of the housing 21a (outside of the openings). Reference numerals 121g and 121h indicate an adhering part between the bundle of hollow fiber membranes 121b and the housing 121a, which is a so-called potting part. With the provision of the potting parts 121g, 121h, off gas which flows through the hollow passage that is the inside of the hollow fiber membrane HF and dry air (humidified air) which flows outside of the hollow fiber membrane HF are not mixed together. In the hollow fiber membrane module 121, one end of the housing 121a is used as an off gas inlet 121cin, and the other end of the housing 121a is used as an off gas outlet 121cout. The openings provided at one end of the housing 121a are used as dry air inlets 121din, while the openings provided at the other end of the housing 121a are used as humidified air outlets 121dout. The hollow fiber membrane module 121 is manufactured by inserting a certain number of bundles consisting of hollow fiber membranes HF into the housing 121a, and securely fixing both end-proximate portions thereof with an adhesive, and then cutting the bundle of hollow fiber membranes HF along both ends of the housing 121a.

The details of the construction for generating a turbulent flow provided on the inner surface of the housing 121a will be described later on.

The distributor 122 at one end and the distributor 123 at another end fix two hollow fiber membrane modules 121 and 121 in a predetermined positional relation. The distributor 122 at one end possesses the outlet 122a of the off gas and the inlet 122b for the dry air. The outlet 122a for the off gas is communicated with the outlet 121dout for the off gas flow by means of an inner passage 122a' placed inside the distributor 122a at one end (see FIGS. 11A and 11B). The inlet 122cin for the dry air is communicated with inlets 121c, 121c, . . . for the dry air by means of an inner passage 122b' placed at the side of the distributor 122a at one side (see FIGS. 11A and 11B).

On the other hand, an inlet 123a for the off gas and an outlet 123b for the humidified air are formed on the distributor 123 at another end. The inlet 123a for the off gas is communicated with the inlet 121din for the off gas flow possessed by the hollow fiber membrane modules 121 and 121 by means of an inner passage 123a' placed inside the distributor 123 at another end (see FIG. 11A). The outlet 123b for the humidified air is communicated with the outlet 121cout for the humidified air of the hollow fiber membrane modules 121 by means of an inner passage 123b' placed inside the distributor 123 at another end (see FIG. 11A).

The hollow fiber membranes HF used in the hollow fiber membrane module 121 are composed of long and fine hollow fibers having an inner diameter of approximately from 300 to 700 micrometers. Due to the long and fine hollow fibers, the hollow fiber membrane HF has characteristics of high membrane density per the hollow fiber module and a high pressure resistance. The principal of the moisture separation is that when the off gas which is a moist gas flows inside the hollow fiber membrane, the steam (water vapor) is condensed in the capillary tube, since the vapor pressure in the capillary tube of the hollow fiber membrane HF is decreased. The condensed moisture is drawn out by capillary action and water permeates the hollow fiber membrane HF from inside to outside or the reverse.

Figure 11C:
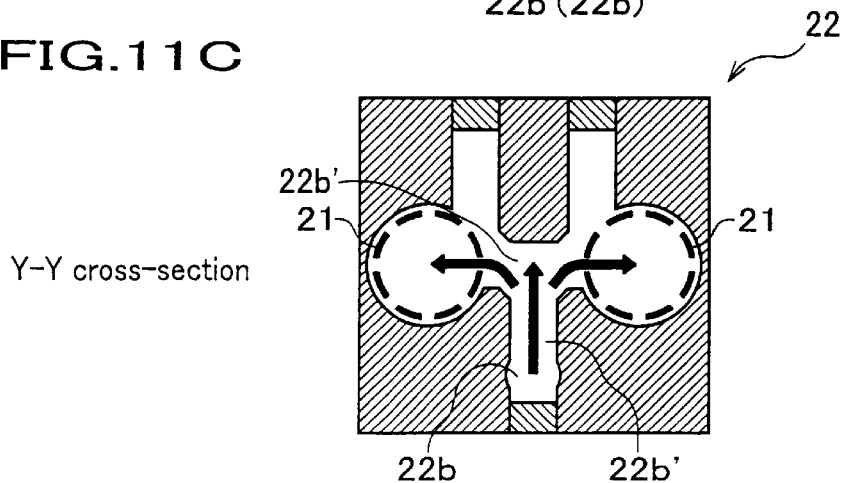

Next, the functions of the humidifier 2 according to the present invention are described by referring to FIGS. 10 and 11.

The off gas, which is the moist gas, flows in the humidifier 2 from the inlet 123a for the off gas possessed by the distributor 23. The off gas is then passed through the inner passage 123a', and reaches the inlet 121din for the off gas flow of the hollow fiber membrane module 121, at which the off gas is branched to each of the hollow fiber membranes HF, HF, . . . making up the bundle 121b of the hollow fiber membranes. At this time, the off gas gives the moisture contained therein the dry air flowing outside the hollow fiber membrane HF. The off gas flowing inside the hollow fiber membrane HF exits the interior of each hollow fiber membrane HF. The off gas exiting each hollow fiber membrane HF is combined, the combined off gas flows in the inner passage 122a' to reach the outlet 122a for the off gas, which is then flows toward the later gas/liquid separator 3. Since the inner passage 123a' of the distributor 123 is communicated with two hollow fiber membrane modules 121 and 121, the off gas is distributed in each of two hollow fiber membrane modules 121 and 121. This can be applicable to the inner passage 122a' of the distributor 122, the explanation will be omitted.

On the other hand, the dry air, which is the dry gas, enters the humidifier 2 from the inlet 122b for the dry air, is passed through the inner passage 122b' to reach the inlet 121cin for the dry air, at which the dry air spread over the interior of the housing 121a and flows outside the hollow fiber membrane module 121a. At this time, the dry air receives the moisture from the off gas to be humidified. The humidified air exits the housing 121a from the outlet 121cout, flows in the inner passage 123b' to reach the outlet 123b for the humidified air, after which it flows toward the later gas/liquid separator 3. As described previously, since the inner passage 122b' of the distributor 122 is communicated with two hollow fiber membrane modules 121 and 121, the off gas is distributed in each of two hollow fiber membrane modules 121 and 121. This can be applicable to the inner passage 123b' of the distributor 123, the explanation will be omitted.

By packaging the hollow fiber membrane modules 21 and 21 as described above, the humidifier 2 can be produced in a small size while securing easy handling.

[Fifth to Twelfth Embodiments]

The construction for generating a turbulent flow provided on the inner surface of the housing 121a for the hollow membrane module 121 of the humidifier 2 according to the second aspect of the present invention will now be described. The second aspect of the present invention includes the fifth to twelfth embodiments depending upon the constructions for generating a turbulent flow.

[Fifth Embodiment]

First, the construction for generating a turbulent flow according to the fifth embodiment will be described by referring to FIG. 12.

As shown in FIG. 12, the construction for generating a turbulent flow according to the fifth embodiment is composed of a lattice liner groove 131a provided on the inner surface of the cylindrical housing 131. The cross-sectional shape of the lattice liner groove 131a may be a semicircle or a rectangle.

The housing 131 may be made of a resin, a metal or a ceramic.

Both ends of the housing 131 possess an inlet 132 for the dry air and an outlet 133 for the dry air. Since the inlet 132 for the dry air and the outlet 133 for the dry air have the same configuration, only the configuration of the inlet 132 for the dry air will be described.

Figure 12A:
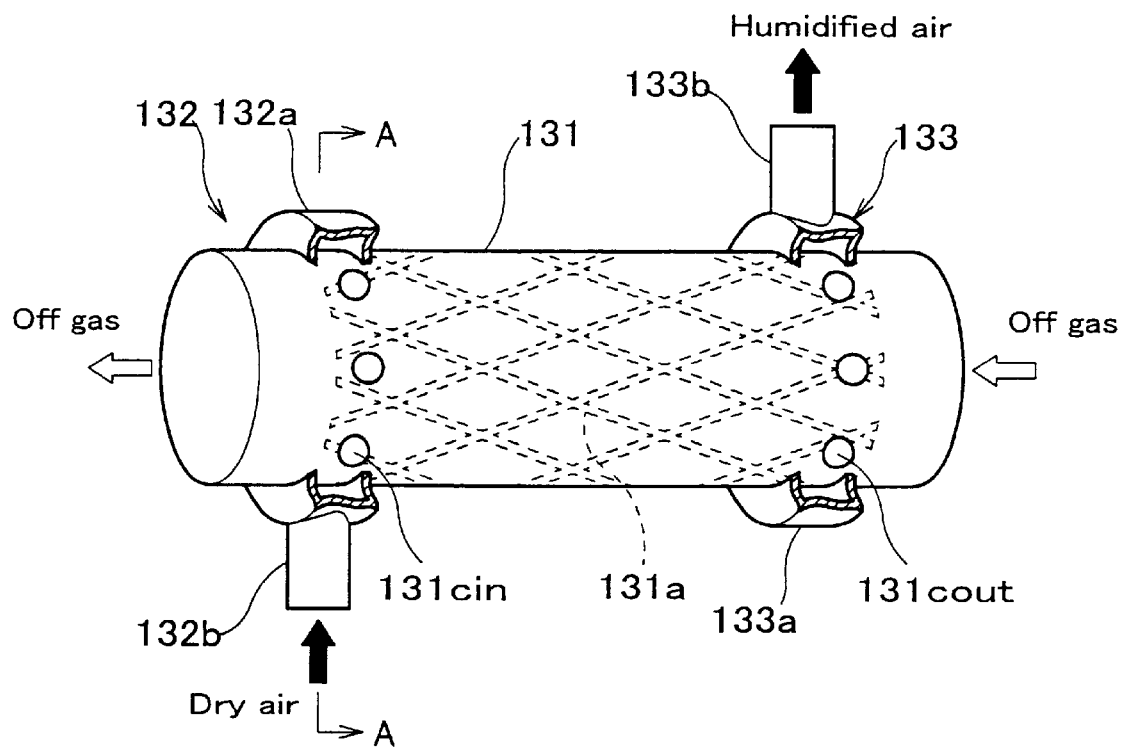
FIGS. 12A–B are drawing showing the fifth embodiment of a construction for generating a turbulent flow of the humidifier according to the second aspect of the present invention.
Figure 12B:
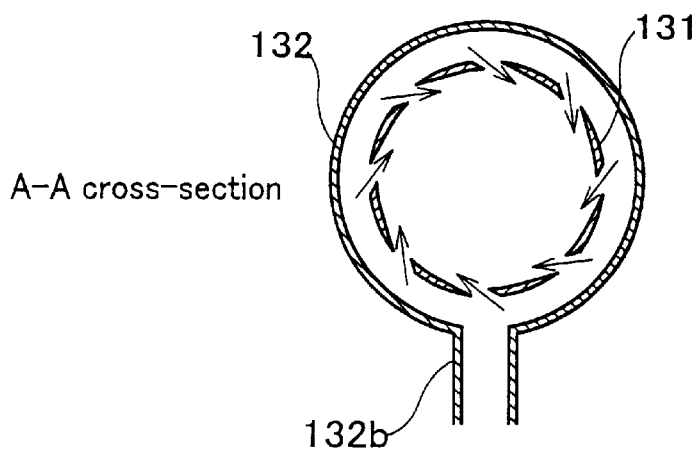

As shown in FIG. 12B, the inlet 132 for the dry air is composed of an inlet 131cin for the dry air flow comprising eight disc pore having a thickness larger than the cylinder perforated in the direction of the tangent lines dividing the inner circumference of the housing 131 into eight so that the dry air introduced into the housing 131 is forcibly subjected to be a circular flow, and a circular ring member 132b with conduit 132b for introducing the dry air, which surrounds outside the inlet 131cin for the dry air flow in the circumferential direction.

By such a configuration, a circular flow can be forcibly formed when the dry air is introduced into the housing and, thus, the dry air can be spread to the central side.

On the other hand, at the outlet 133 for the dry air placed opposing the inlet 132 having the same configuration, a circular flow from center to the outside is formed, and the humidified air I discharged from a conduit 133b of a circular ring member 133a.

Due to the lattice liner groove 131a provided on the inner surface of the cylindrical housing 131, the dry air rectified along the inner surface of the housing 131 to be laminar flow collides with the lattice liner groove 131a and is disturbed, resulting in a turbulent flow. Accordingly, the dry air can be spread over the entire area of the bundle of the hollow fiber membranes.

By the synergism, the dry air having a small moisture content can effectively recover the moisture from the off gas having a high moisture content via the hollow fiber membranes. What is more, the dry air can be uniformly humidified. As a result, the moisture recovery (ratio) of the dry air can be deduced.

In FIG. 12A, whereas the flow of the off gas is counterflow relative to the flow of the dry air, it may be parallel flow.

[Sixth Embodiment]

Next, the construction for generating a turbulent flow according to the sixth embodiment will be described by referring to FIG. 13.

The construction for generating a turbulent flow according to the sixth embodiment is composed of a spiral groove 141a provided on the inner surface of the cylindrical housing 141. The cross-sectional shape of the spiral groove 141a may be a semicircle or a rectangle.

The housing 141 may be made of a resin, a metal or a ceramic.

Both ends of the housing 141 possess an inlet 142 for the dry air having the same configuration of that of the inlet 132 in the fifth embodiment and an outlet 143 for the dry air having the same configuration of that of the outlet 133 in the fifth embodiment. Similar to the fifth embodiment, the dry air is introduced into the housing 141 from an inlet 141cin for the dry air flow and is discharged from an outlet 141cout for the dry air flow.

By such a configuration, a circular flow can be forcibly formed when the dry air is introduced into the housing and, thus, the dry air can be spread to the central side. Also, due to the spiral groove 141a provided on the inner surface of the cylindrical housing 141, the dry air rectified along the inner surface of the housing 141 to be laminar flow collides with the spiral groove 141a and is disturbed, resulting in a turbulent flow. Accordingly, the dry air can be spread over the entire area of the bundle of the hollow fiber membranes.

By the synergism, the dry air having a small moisture content can effectively recover the moisture from the off gas having a high moisture content via the hollow fiber membranes. What is more, the dry air can be uniformly humidified. As a result, the moisture recovery (ratio) of the dry air can be deduced.

Figure 13:
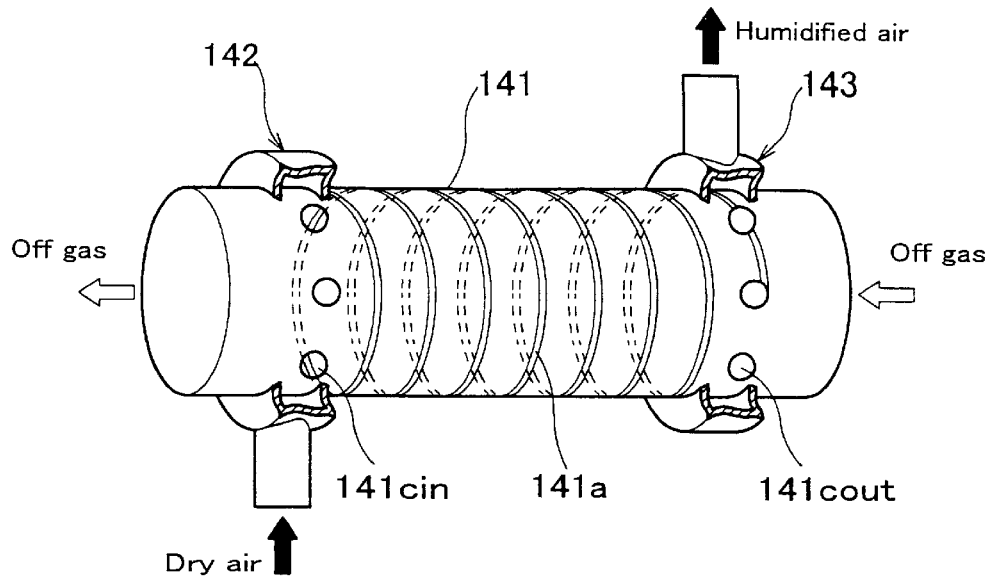
FIG. 13 is a drawing showing the sixth embodiment of a construction for generating a turbulent flow of the humidifier according to the second aspect of the present invention.

In FIG. 13, whereas the flow of the off gas is counter-flow relative to the flow of the dry air, it may be parallel flow.

[Seventh Embodiment]

Next, the construction for generating a turbulent flow according to the seventh embodiment will be described by referring to FIG. 14.

The construction for generating a turbulent flow according to the sixth embodiment is composed of a plurality of liner grooves 151a provided on the inner surface of the cylindrical housing 151. The cross-sectional shape of the groove 151a may be a semicircle or a rectangle.

The housing 151 may be made of a resin, a metal or a ceramic.

Both ends of the housing 151 possess an inlet 152 for the dry air having the same configuration of that of the inlet 132 in the fifth embodiment and an outlet 153 for the dry air having the same configuration of that of the outlet 133 in the fifth embodiment. Similar to the fifth embodiment, the dry air is introduced into the housing 151 from an inlet 151cin for the dry air flow and is discharged from an outlet 151cout for the dry air flow.

By such a configuration, a circular flow can be forcibly formed when the dry air is introduced into the housing and, thus, the dry air can be spread to the central side. Also, due to the grooves 151a provided on the inner surface of the cylindrical housing 151, the dry air rectified along the inner surface of the housing 151 to be laminar flow collides with the grooves 151a and is disturbed, resulting in a turbulent flow. Accordingly, the dry air can be spread over the entire area of the bundle of the hollow fiber membranes.

By the synergism, the dry air having a small moisture content can effectively recover the moisture from the off gas having a high moisture content via the hollow fiber membranes. What is more, the dry air can be uniformly humidified. As a result, the moisture recovery (ratio) of the dry air can be deduced.

Figure 14A:
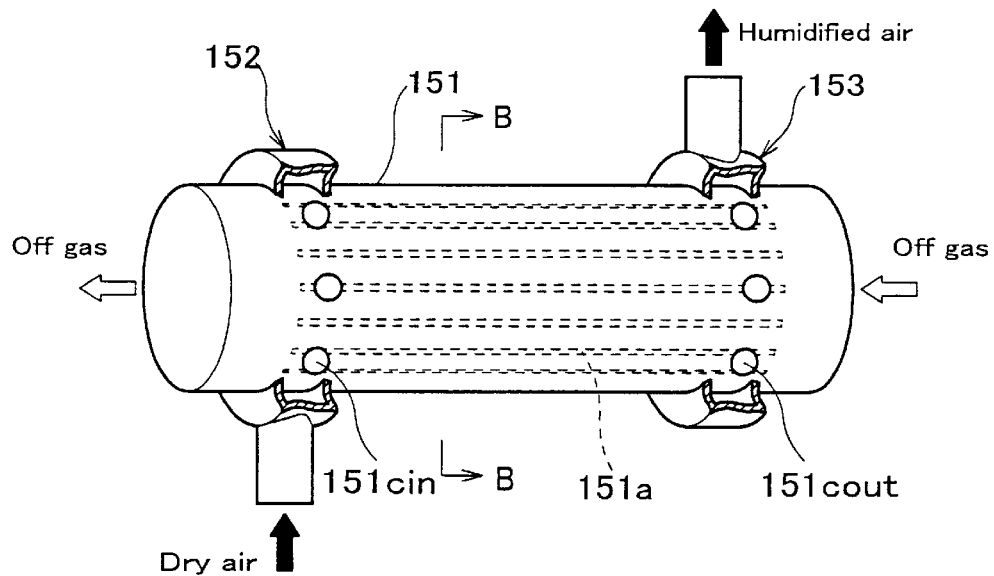
FIGS. 14A–B are drawing showing the seventh embodiment of a construction for generating a turbulent flow of the humidifier according to the second aspect of the present invention.
Figure 14B:
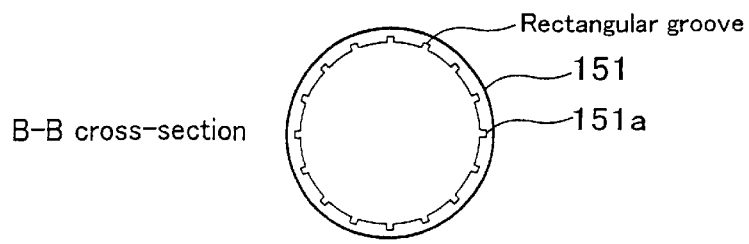

In FIG. 14, whereas the flow of the off gas is counter-flow relative to the flow of the dry air, it may be parallel flow.

[Eighth Embodiment]

Next, the construction for generating a turbulent flow according to the eighth embodiment will be described by referring to FIG. 15.

The construction for generating a turbulent flow according to the eighth embodiment is composed of a plurality of circular grooves 161a provided on lengthwise direction of the inner surface of the cylindrical housing 141 at a given interval. The cross-sectional shape of the grooves 161a may be a semicircle or a rectangle.

The housing 161 may be made of a resin, a metal or a ceramic.

Both ends of the housing 161 possess an inlet 162 for the dry air having the same configuration of that of the inlet 132 in the fifth embodiment and an outlet 163 for the dry air having the same configuration of that of the outlet 133 in the fifth embodiment. Similar to the fifth embodiment, the dry air is introduced into the housing 161 from an inlet 161cin for the dry air flow and is discharged from an outlet 161cout for the dry air flow.

By such a configuration, a circular flow can be forcibly formed when the dry air is introduced into the housing and, thus, the dry air can be spread to the central side. Also, due to the circular grooves 161a provided on the inner surface of the cylindrical housing 161, the dry air rectified along the inner surface of the housing 161 to be laminar flow collides with the circular grooves 161a and is disturbed, resulting in a turbulent flow. Accordingly, the dry air can be spread over the entire area of the bundle of the hollow fiber membranes.

By the synergism, the dry air having a small moisture content can effectively recover the moisture from the off gas having a high moisture content via the hollow fiber membranes. What is more, the dry air can be uniformly humidified. As a result, the moisture recovery (ratio) of the dry air can be deduced.

Figure 15:
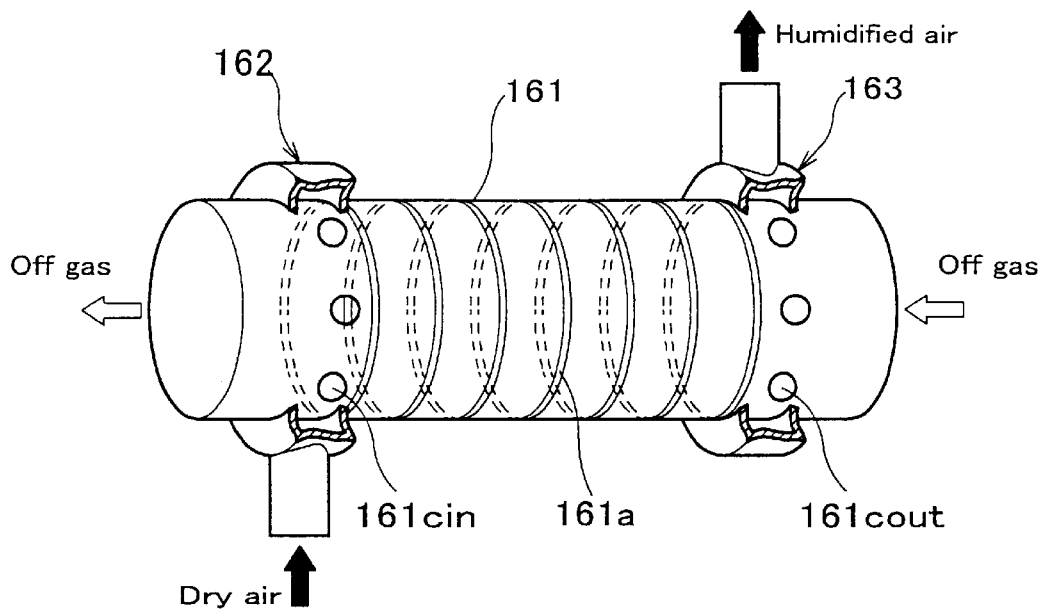
FIG. 15 is a drawing showing the eighth embodiment of a construction for generating a turbulent flow of the humidifier according to the second aspect of the present invention.

In FIG. 15, whereas the flow of the off gas is counter-flow relative to the flow of the dry air, it may be parallel flow.

[Ninth Embodiment]

Next, the construction for generating a turbulent flow according to the ninth embodiment will be described by referring to FIG. 16.

The construction for generating a turbulent flow according to the ninth embodiment is composed of a plurality of projections 171a provided on the inner surface of the cylindrical housing 171 at a given interval. The cross-sectional shape of the projection 171a may be a semicircle as shown in FIG. 16B or may be a pyramid.

The housing 171 may be made of a resin, a metal or a ceramic.

Both ends of the housing 171 possess an inlet 172 for the dry air having the same configuration of that of the inlet 132 in the fifth embodiment and an outlet 173 for the dry air having the same configuration of that of the outlet 133 in the fifth embodiment. Similar to the fifth embodiment, the dry air is introduced into the housing 171 from an inlet 171cin for the dry air flow and is discharged from an outlet 171cout for the dry air flow.

By such a configuration, a circular flow can be forcibly formed when the dry air is introduced into the housing and, thus, the dry air can be spread to the central side. Also, due to the projections 171a provided on the inner surface of the cylindrical housing 171, the dry air rectified along the inner surface of the housing 171 to be laminar flow collides with the projections 171a and is disturbed, resulting in a turbulent flow. Accordingly, the dry air can be spread over the entire area of the bundle of the hollow fiber membranes.

By the synergism, the dry air having a low moisture content can effectively recover the moisture from the off gas having a high moisture content via the hollow fiber membranes. What is more, the dry air can be uniformly humidified. As a result, the moisture recovery (ratio) of the dry air can be deduced.

Figure 16A:
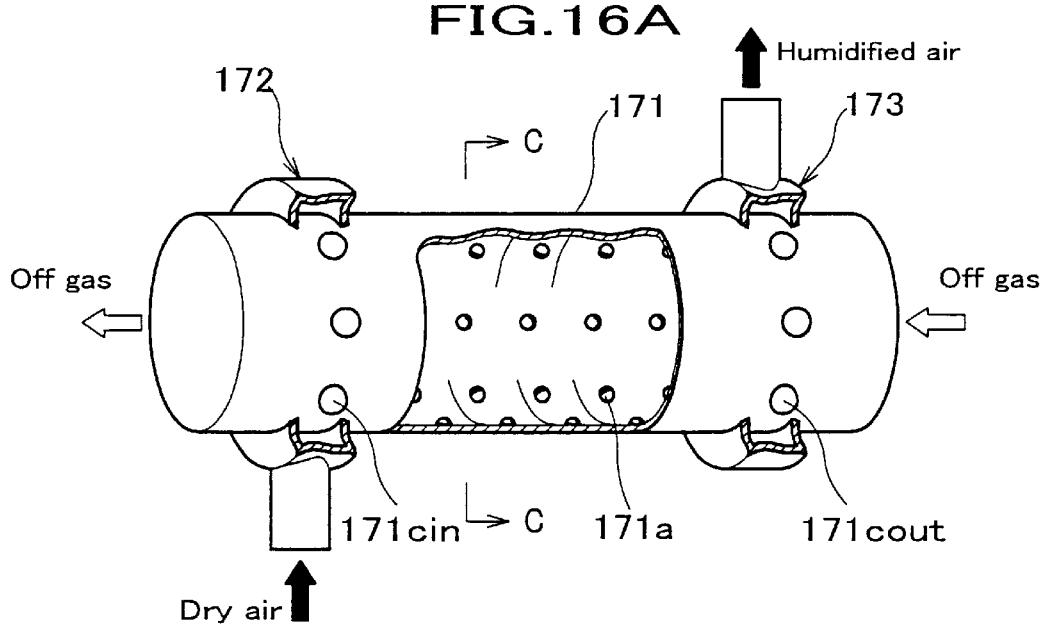
FIGS. 16A–B are drawing showing the ninth embodiment of a construction for generating a turbulent flow of the humidifier according to the second aspect of the present invention.
Figure 16B:
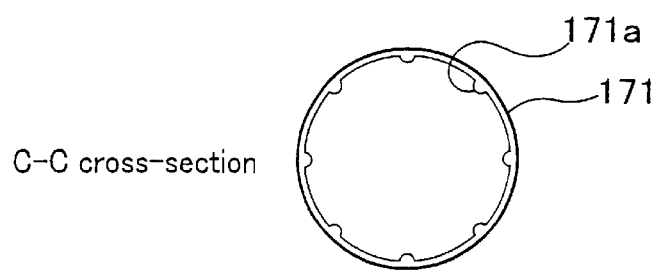

In FIG. 16, whereas the flow of the off gas is counter-flow relative to the flow of the dry air, it may be parallel flow.

[Tenth to Twelfth Embodiments]

The tenth to twelfth embodiments of the construction for generating a turbulent flow in which the housing 121a is externally swelled symmetrically with the axis thereof will now be described by referring to FIGS. 17 to 19.

[Tenth Embodiment]

Figure 17A:
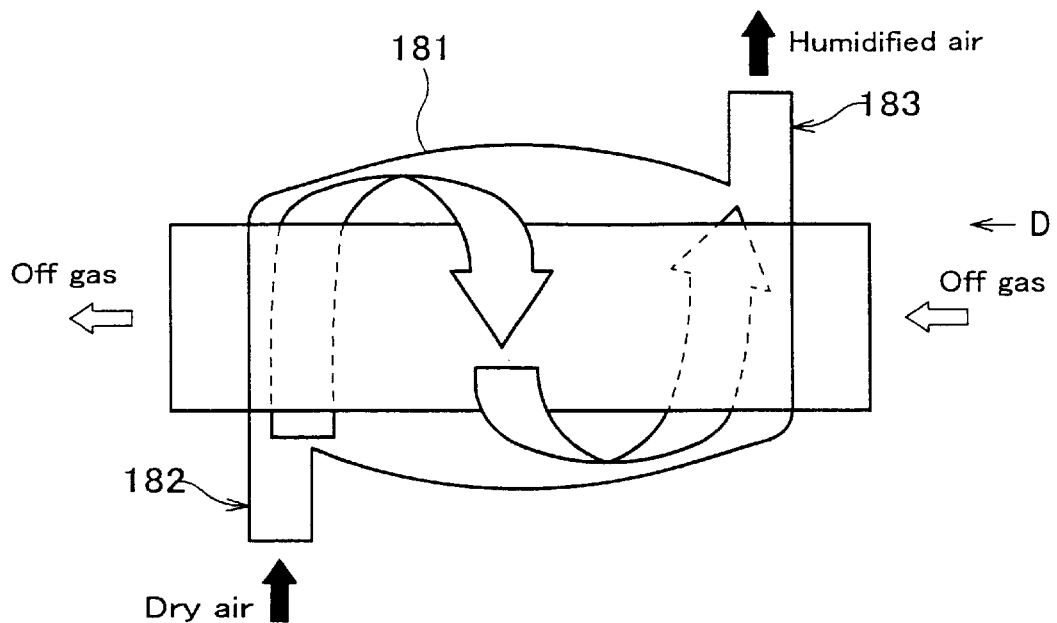
FIGS. 17A–B are drawing showing the tenth embodiment of a construction for generating a turbulent flow of the humidifier according to the second aspect of the present invention.

As shown in FIG. 17A, the housing 181 does not have a cylindrical shape but has an elliptical shape in which the center of the cylinder is externally swelled symmetrically with the axis thereof. However, the shape of the housing 181 is not restricted thereto as long as the center of the housing is swelled symmetrically with the axis thereof such as an oval or a dish-like shape.

The housing 181 may be made of a resin, a metal or a ceramic.

Both ends of the housing 181 possess a conduit 182 for the introduction of the dry air into the housing 181 and a conduit 183 for flowing the humidified air out of the housing 181.

These conduits 182 and 183 are placed so as to be symmetric with each other in the direction of the tangent line of both ends of the housing 181 as shown in FIG. 12B.

As described above, by making up the housing in the an elliptical shape in which the center of the cylinder is externally swelled symmetrically with the axis thereof, and providing the conduits as to be symmetric with each other in the direction of the tangent line of both ends of the housing, the dry air which is the dry gas, introduced into the housing can flow as a circular flow along the inner circumferential surface of the housing, and the dry air can flow from the outside to the center. Accordingly, the dry air collides with the bundle of the hollow fiber membrane to be a turbulent flow. By forming the housing in an elliptical shape, the pack density of the hollow fiber membrane is decreased and, thus, the gaps between the hollow fiber membranes are increased. Accordingly, the contact area between the membrane and the dry air is increased.

As a result, by such a synergism, since the dry air uniformly flows on the surface of each hollow fiber membrane accommodated within the housing, the dry air having a low moisture content can effectively recover the moisture from the off gas having a high moisture content via the hollow fiber membranes. What is more, the dry air can be uniformly humidified.

Figure 17B:
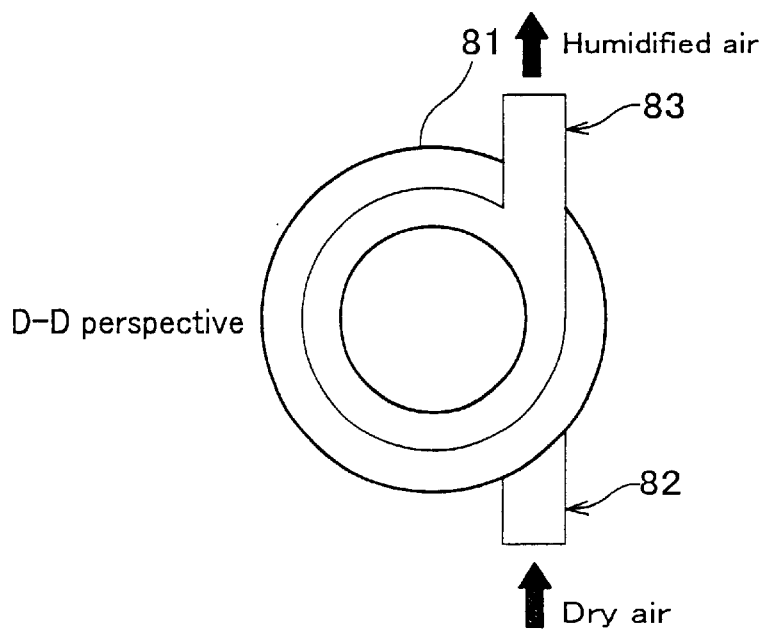

In FIG. 17, whereas the flow of the off gas is counter-flow relative to the flow of the dry air, it may be parallel flow.

[Eleventh Embodiment]

The eleventh embodiment of the construction for generating a turbulent flow in which the housing 121a is externally swelled symmetrically with the axis thereof will now be described by referring to FIG. 18.

In the construction for generating a turbulent flow according to this embodiment, the housing does not have a an elliptical shape in which the center of the cylinder is externally swelled symmetrically with the axis thereof according to the tenth embodiment, but has a deformed elliptical shape in which one end of the cylinder is externally swelled symmetrically with the axis thereof. The swell position is at the side where the dry air is introduced. Similar to the tenth embodiment, the shape of the housing 191 is not restricted thereto as long as the one end of the housing is swelled symmetrically with the axis thereof such as a deformed oval or a deformed dish-like shape.

The housing 191 may be made of a resin, a metal or a ceramic.

Both ends of the housing 191 possess a conduit 192 for the introduction of the dry air into the housing 191 and a conduit 193 for flowing the humidified air out of the housing 191.

These conduits 192 and 193 are placed so as to be symmetric with each other in the direction of the tangent line of both ends of the housing 191 as in the case of the tenth embodiment.

As described above, by making up the housing in the an elliptical shape in which the center of the cylinder is externally swelled symmetrically with the axis thereof, and providing the conduits as to be symmetric with each other in the direction of the tangent line of both ends of the housing, the dry air which is the dry gas, introduced into the housing can flow as a circular flow along the inner circumferential surface of the housing, and the dry air can flow from the outside to the center. Accordingly, the dry air collides with the bundle of the hollow fiber membrane to be a turbulent flow.

Also, by forming the housing in a deformed shape, the pack density of the hollow fiber membrane is decreased and, thus, the gaps between the hollow fiber membranes are increased. Accordingly, the contact area between the membrane and the dry air is increased.

As a result, by such a synergism, since the dry air uniformly flows on the surface of each hollow fiber membrane accommodated within the housing, the dry air having a low moisture content can effectively recover the moisture from the off gas having a high moisture content via the hollow fiber membranes. What is more, the dry air can be uniformly humidified.

Figure 18:
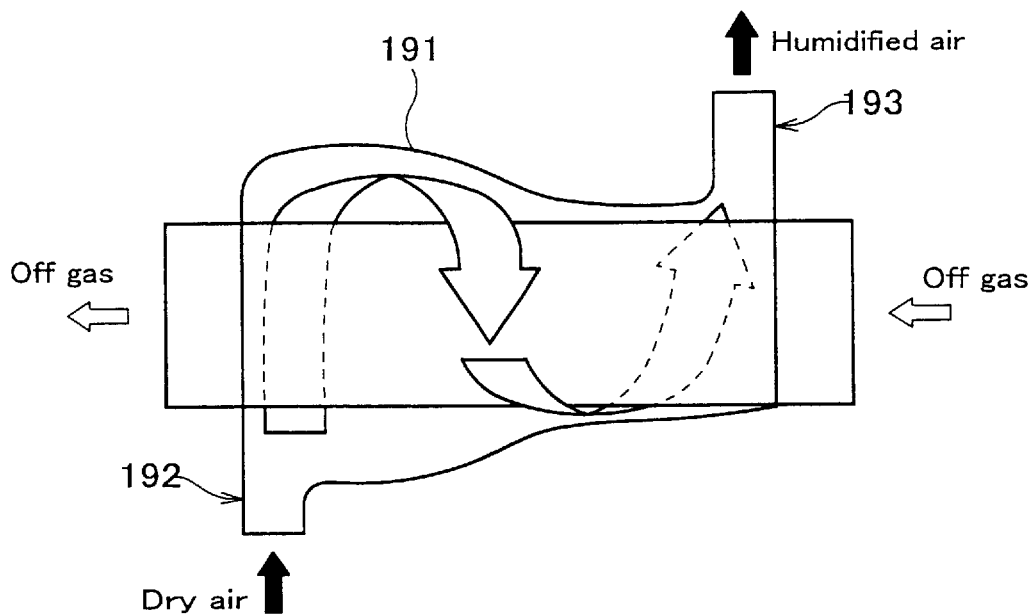
FIG. 18 is a drawing showing the eleventh embodiment of a construction for generating a turbulent flow of the humidifier according to the second aspect of the present invention.

In FIG. 18, whereas the flow of the off gas is counter-flow relative to the flow of the dry air, it may be parallel flow.

[Twelfth Embodiment]

The eleventh embodiment of the construction for generating a turbulent flow in which the housing 121a is externally swelled symmetrically with the axis thereof will now be described by referring to FIG. 18.

In the construction for generating a turbulent flow according to this embodiment, the housing 191' does not have a an elliptical shape in which the center of the cylinder is externally swelled symmetrically with the axis thereof according to the tenth embodiment, but has a deformed elliptical shape in which one end of the cylinder is externally swelled symmetrically with the axis thereof. The swell position is at the side where the dry air is discharged. The shape of the housing 191' is not restricted thereto as long as the one end of the housing is swelled symmetrically with the axis thereof such as a deformed oval or a deformed dish-like shape.

The housing 191' may be made of a resin, a metal or a ceramic.

Both ends of the housing 191' possess a conduit 192' for the introduction of the dry air into the housing 191' and a conduit 193' for flowing the humidified air out of the housing 191'.

These conduits 192' and 193' are placed so as to be symmetric with each other in the direction of the tangent line of both ends of the housing 191' as in the case of the eleventh embodiment.

As described above, by making up the housing in the an elliptical shape in which the center of the cylinder is externally swelled symmetrically with the axis thereof, and providing the conduits as to be symmetric with each other in the direction of the tangent line of both ends of the housing, the dry air which is the dry gas, introduced into the housing can flow as a circular flow along the inner circumferential surface of the housing, and the dry air can flow from the outside to the center. Accordingly, the dry air collides with the bundle of the hollow fiber membrane to be a turbulent flow.

Also, by forming the housing in a deformed shape, the pack density of the hollow fiber membrane is decreased and, thus, the gaps between the hollow fiber membranes are increased. Accordingly, the contact area between the membrane and the dry air is increased.

As a result, by such a synergism, since the dry air uniformly flows on the surface of each hollow fiber membrane accommodated within the housing, the dry air having a low moisture content can effectively recover the moisture from the off gas having a high moisture content via the hollow fiber membranes. What is more, the dry air can be uniformly humidified.

Figure 19:
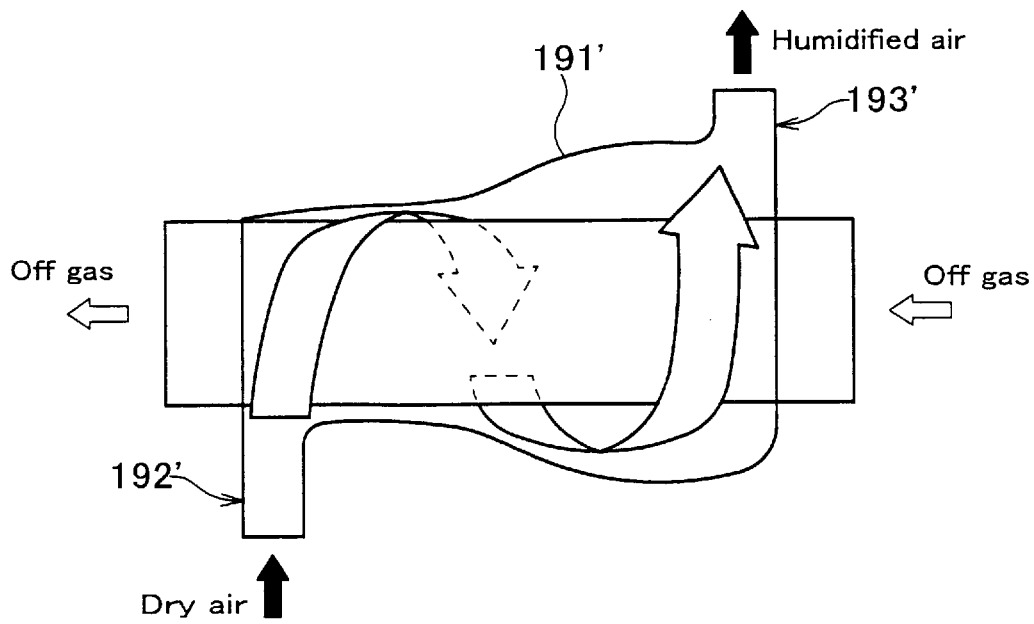
FIG. 19 is a drawing showing the twelfths embodiment of a construction for generating a turbulent flow of the humidifier according to the second aspect of the present invention.

In FIG. 19, whereas the flow of the off gas is counter-flow relative to the flow of the dry air, it may be parallel flow.

The advantages of the counter flow and the parallel flow are as described in the first aspect. Also, temperature adjustment function of the humidifier are as described in the first aspect.

As described above, by providing the construction for generating a turbulent flow on the inner surface of the housing the following effects can be obtained.

(1) By providing (a) groove(s) or projection(s) on the inner surface of the housing or forming the housing in an elliptical shape, a turbulent flow easily occurs in the housing, spreading the dry air over the entire external surface of the bundle of the hollow fiber membranes. This solves the problem that there is a difference in the moisture concentration of the dry air depending upon the position of the housing. As a result, the dry air can effectively recover the moisture and can be uniformly humidified. Also, the moisture recovery (ratio) of the dry air can be deduced. In the case where a groove or grooves is (are) provided on the inner surface of the housing, the housing can be formed in a lightweight.

It should be noted that the constructions for generating a turbulent flow according to the fifth to twelfth embodiments might suitably be combined. Any combination of the constructions can produce a stronger turbulent flow, leading to increasing the moisture recovery.

[Third Aspect]

The humidifier according to the third aspect of the present invention will now be described by referring to the drawings.

The configuration and the functions of the humidifier according to this aspect are similar to those described in the second aspect (see FIGS. 10 and 11). The humidifier according to the third aspect is characterized by a construction for generating a turbulent flow provided inside the hollow fiber membrane HF.

The thirteenth to fifteenth embodiments of the constructions for generating a turbulent flow provided inside the hollow fiber membrane HF will now be described by referring to FIGS. 20A to 20C

[Thirteenth Embodiment]

First, the construction for generating a turbulent flow provided inside the hollow fiber membrane HF according to the thirteenth embodiment will be described by referring to FIG. 20A.

The construction for generating a turbulent flow is composed of projections 231a provided on the entire surface at a given interval along the inner surface of a cylindrical hollow fiber membrane 231 into which the off gas, which is a moist gas, flows. With regard to the cross-sectional shape of the projection, although a semicircle is exemplified in FIG. 20A, it is not restricted thereto as long as the projection projects toward the center of the hollow fiber membrane 231 such as a rectangle or a pyramid.

In order to provide the projections 231a on the inner surface, for example, fine particles having a UV curing resin applied thereon are transferred into the hollow fiber membrane 231 followed by irradiating a ultraviolet light to thereby fix the fine particles on the inner surface of the hollow fiber membrane 231.

As the UV curing resin used herein is a colorless ultraviolet curing oligoner insoluble in water and a solvent, for example, commercially available from Kyoei Kagaku CO., Ltd.

By providing the projections 231a on the inner surface of the hollow fiber membrane 231, the off gas flowing along the inner surface is collided with the projections 231a, and is mixed and stirred with the off gas flowing at the central side whereby a turbulent flow occurs. As a result, the off gas whose moisture distribution has been uniform flows along the inner surface. In this case, the moisture-permeability from the off gas side to the dry air side becomes high in comparison with the case where no projection is provided.

Figure 20A:
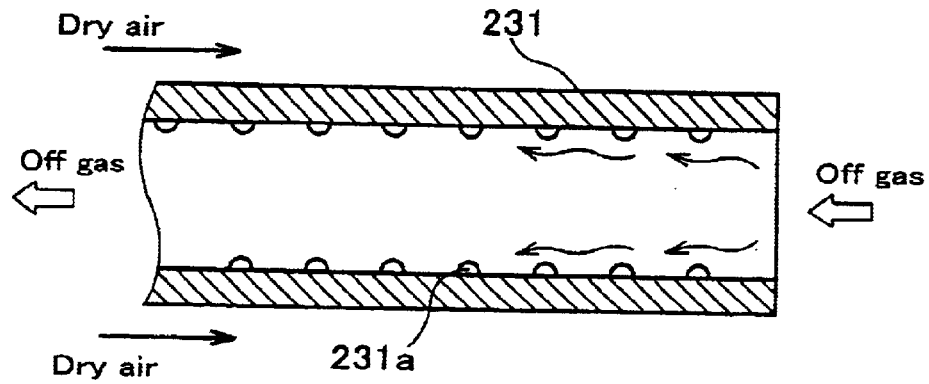
FIG. 20A is a cross-sectional view showing the thirteenth embodiment of a construction for generating a turbulent flow provided inside the hollow fiber membrane used in the humidifier according to the third aspect of the present invention.

In FIG. 20A, whereas the off gas flows countercurrently relative to the flow of the dry air, the off gas may flow parallel to the dry air.

[Fourteenth Embodiment]

Next, the construction for generating a turbulent flow provided inside the hollow fiber membrane HF according to the fourteenth embodiment will be described by referring to FIG. 20B.

The construction for generating a turbulent flow is composed of twisted fins 241a press-fit at an inlet for the off gas.

Each twisted fin 241a has a shape that a rectangle plate is twisted 180 degree. Although the twisted fin 241a shown in FIG. 20B is only twisted in one direction, it is possible that a left element in which the flow of the off gas is twisted in the left direction and a right element in which the flow of the off gas is twisted in the right direction are combined to form a connected fin in such a manner than each of the element has a right angle.

The twisted fin 241a is typically made of a metal such as stainless steel or titanium, but may also be made of a resin or a ceramic.

By providing the twisted fins 241a at the inlet for the off gas and stirring the off gas by means of the twisted fins 241a, the off gas may become a turbulent flow. As a result, the off gas whose moisture distribution has been uniform flows along the inner surface. In this case, the moisture-permeability from the off gas side to the dry air side becomes high in comparison with the case where no projection is provided.

Figure 20B:
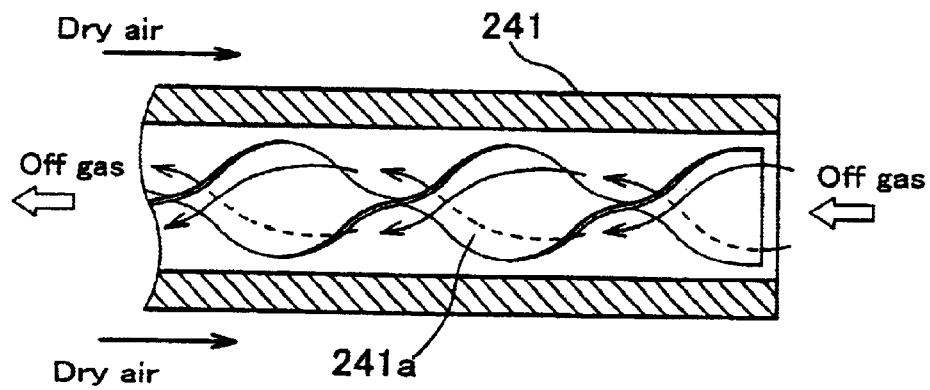
FIG. 20B is a cross-sectional view showing the fourteenth embodiment of a construction for generating a turbulent flow provided inside the hollow fiber membrane used in the humidifier according to the third aspect of the present invention.

In FIG. 20B, whereas the off gas flows countercurrently relative to the flow of the dry air, the off gas may flow parallel to the dry air. In this case, the position where the twisted fins 241a are provided is opposite the position depicted on FIG. 20B.

[Fifteenth Embodiment]

Next, the construction for generating a turbulent flow provided inside the hollow fiber membrane HF according to the fifteenth embodiment will be described by referring to FIG. 20C.

The construction for generating a turbulent flow according to the fifteenth embodiment is composed of a stepped portion 251a on the inner surface by crushing part of the inner surface at the inlet for the introduction of the off gas of the cylindrical hollow fiber membrane 251. In FIG. 20C, the stepped portion 251a is provided at one side, but stepped portions 251a may be provided at both side in which case the stepped portions 251a are asymmetrical with each other relative to the axis of the hollow fiber membrane 251.

By providing the stepped portion 251a at the inlet for the off gas, since the off gas is collide with the stepped portion 251a at the inlet and is disturbed, the off gas may become a turbulent flow. As a result, the off gas whose moisture distribution has been uniform flows along the inner surface of the hollow fiber membrane 251. In this case, the moisture-permeability from the off gas side to the dry air side becomes high in comparison with the case where no projection is provided.

Figure 20C:
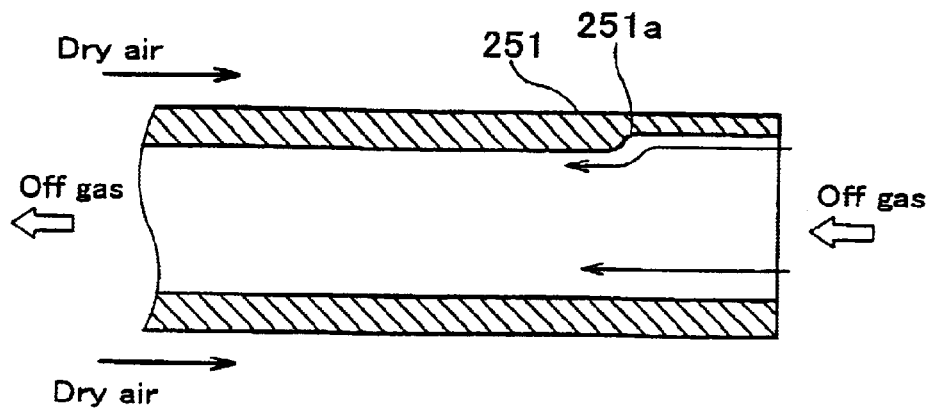
FIG. 20C is a cross-sectional view showing the fifteenth embodiment of a construction for generating a turbulent flow provided inside the hollow fiber membrane used in the humidifier according to the third aspect of the present invention.

In FIG. 20C, whereas the off gas flows countercurrently relative to the flow of the dry air, the off gas may flow parallel to the dry air.

By providing the projections, twisted fin or step making up the construction for generating a turbulent flow inside the hollow fiber membrane, a turbulent flow easily occurs, when the off gas is introduced into the hollow fiber membrane. As a result, the water can be effectively recovered from the entire areas of bundle of the hollow fiber membranes including the ends of the housing, improving the recovery of the water. By providing two of more constructions for generating a turbulent in combination, the water distribution of the off gas becomes more uniform and, thus, the water-permeability from the off gas to the dry air becomes high in comparison with the case where one construction is provided.

[Process for Producing Hollow Fiber Module]

Also, in the course of the creation of the present invention, we have found processes for producing a hollow fiber membrane module suitable for solving the problem associated with the prior arts: The third aspect of the present invention is applied to a hollow fiber membrane module in which the hollow fibers aligned straight are bundled. However, since the hollow fiber membranes are very fine and long, they are intertwined with each other or they are disturbed due to their twisting. As a result, the dry air flowing outside the hollow fiber membrane is not spread over the entire area of the membrane, decreasing the water-permeability from the off gas to the dry air or increasing the pressure loss due to a partial block of the passage of the dry air. For this reason, a process has been desired, which can align the hollow fiber membrane in straight.

Figure 21:
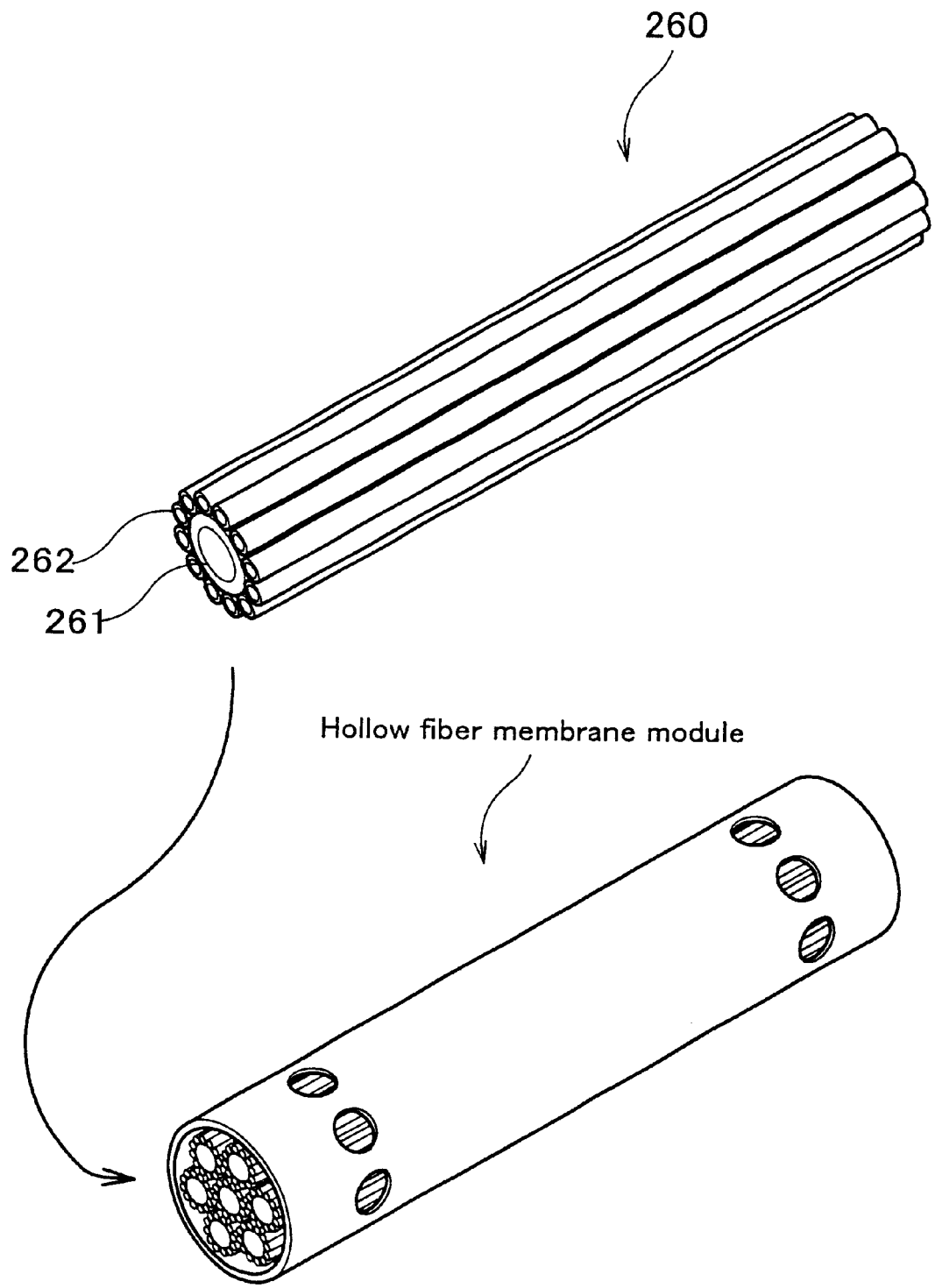
FIG. 21 is a drawing which explains a first process for producing a hollow fiber membrane module, which can accommodate the hollow fiber membranes used in the humidifier according to the third aspect of the present invention aligned in a straight form.

Processes for producing a hollow fiber membrane module capable of aligning the hollow fiber membrane in straight are described by referring to FIGS. 21 and 22.

[First Process]

According to the first process for producing a hollow fiber membrane module which can align the hollow fiber membranes in straight, hollow fiber membranes having different thickness are used in combination.

As shown in FIG. 21, in first step, the thickest hollow fiber membrane 261 is used as the core, and any other finer hollow fiber membranes 262 surround the core hollow fiber membrane 261 to produce one unit of hollow fiber membranes. For example, relative to 20 to 30 fine hollow fiber membranes, one thick hollow fiber membrane having a diameter approximately twice the fine hollow fiber membranes is mixed.

In second step, a plurality of units 260 are inserted into the housing of the hollow fiber membrane module.

By producing the hollow fiber membrane module as described above, the thickest hollow fiber membrane 261, which is relatively difficult to be bent, serves as a core material and, thus, prevents the disturbing of other hollow fiber membranes 262. As a result, the hollow fiber membranes 261 and 262 can be aligned in straight in the hollow fiber membrane module and, thus the dry air flowing outside the bundle of the hollow fiber membranes is spread over the entire area of the membrane. Accordingly, the water-permeability from the off gas to the dry air can be enhanced and the pressure loss of the passage of the dry air can be decreased.

[Second Process]

According to the second process for producing a hollow fiber membrane module which can align the hollow fiber membranes in straight, static electricity is used in the course of the production.

The process utilizing static electricity is described by referring to FIG. 22.

Figure 22A:
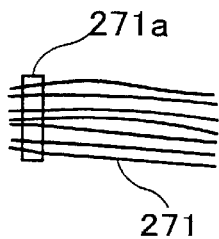
FIGS. 22A–H are drawing which explains a second process for producing a hollow fiber membrane module, which can accommodate the hollow fiber membranes used in the humidifier according to the third aspect of the present invention aligned in a straight form.

<First Step> One side of a plurality of hollow fiber membranes 271 is fixed on a fixing portion 271a (see FIG. 22A).

Figure 22B:
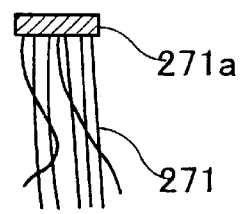
Figure 22C:
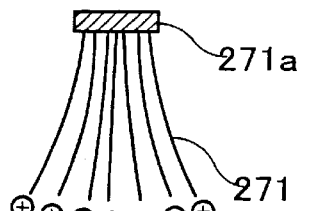
Figure 22D:
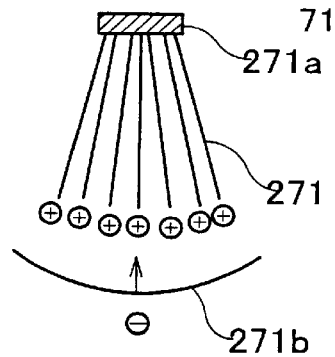

<Second Step> The hollow fiber membranes 271 are suspended vertically so that the fixing portion 271a is placed at a top side (see FIG. 22B).

By suspending the hollow fiber membranes 271 vertically, each of the hollow fiber membranes 271 is difficult to be sagged.

<Third Step> The hollow fiber membranes 271 are charged with static electricity (see FIG. 20C). For example, a belt type dynamo can be used, which is used in a scientific experiment. By charging the hollow fiber membranes 271 with static electricity, all of the hollow fiber membranes 271 are charged with the same electricity (positive charge) and thus, they are repel each other. As a result, twisting and slaking of the hollow fiber membranes are solved.

<Fourth Step> A static electrode 271b having the charge (negative charge) opposite the charge of the hollow fiber membrane 271 (positive charge) is brought to the hollow fiber membrane 271 at a distance no corona discharge takes place (see FIG. 20D). In this case, the static electrode 271b should have a area at least four times the area of the fixing portion 271a.

Figure 22E:
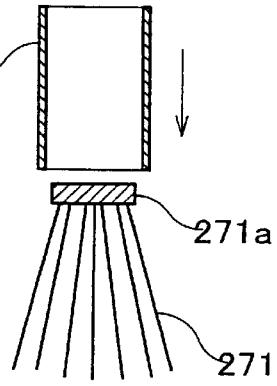

<Fifth Step> By bringing the static electrode 271b having the charge (negative charge) opposite the charge of the hollow fiber membrane 271 (positive charge) to the hollow fiber membrane 271 at the given distance, the hollow fiber membrane 271 can be fixed on the space by the static electric force (see FIG. 22E).

Figure 22F:
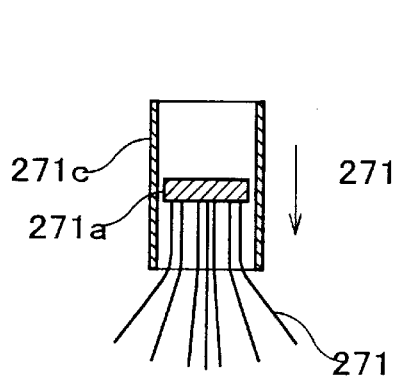
Figure 22G:
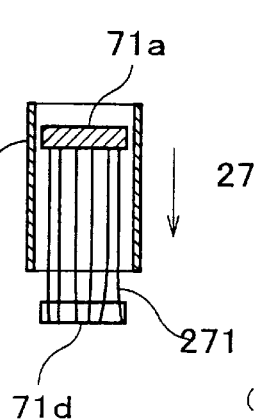
Figure 22H:
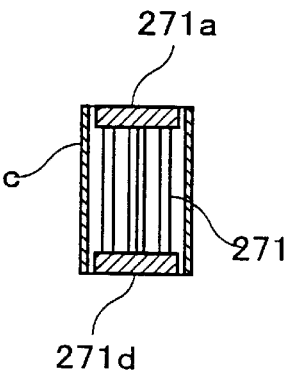
Figure 23:
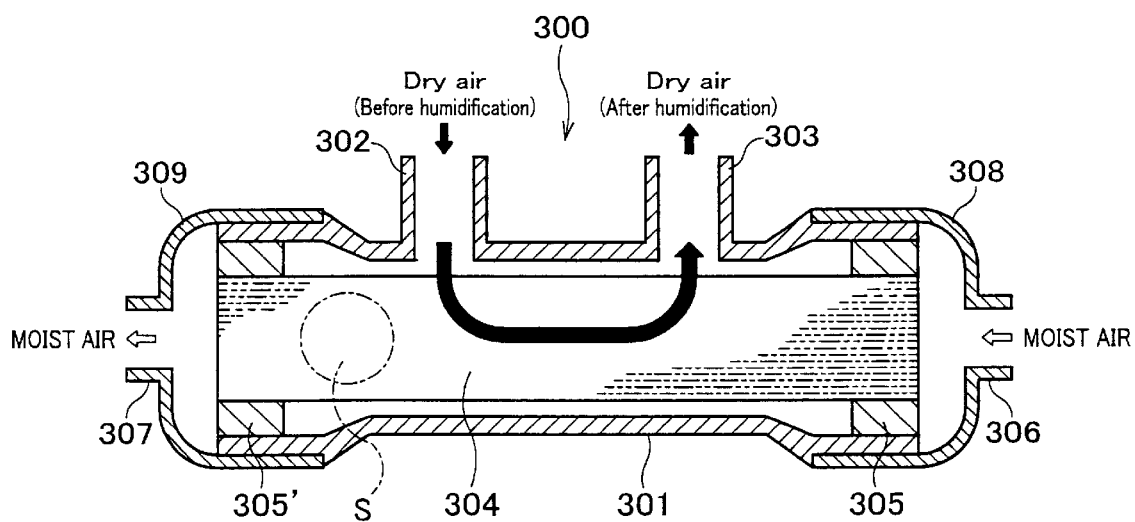
FIG. 23 is a cross-sectional view showing the conventional humidifier utilizing a hollow fiber membrane module.

<Sixth Step> Subsequently, a electrically conductive, hollow cylinder 271c (for example, made of a metal) is covered with the hollow fiber membrane 271 from the side of the fixing portion 271a to accommodate the bindle of the hollow fiber membrane 271 flared by the repulsion within the hollow cylinder 271c (see FIGS. 22E and 22F).

This cancels the static electricity of the hollow fiber membranes 271 accommodated within the hollow cylinder 271c. Accordingly, the hollow fiber membranes 271 can be accommodated within the hollow cylinder 271 in the state where the hollow fiber membranes 271 accommodated within the hollow cylinder 271c are aligned.

<Seventh Step> Another side of the hollow fiber membranes 271 which is unfixed is fixed on a fixing portion 271d (see FIG. 22G), the fixing portion 271d is accommodated within the hollow cylinder 271c (see FIG. 22H), to complete the production of the hollow fiber membrane module.

By producing the hollow fiber membrane module as described above, the hollow fiber membranes 271 can be aligned in straight in the hollow fiber membrane module and a hollow fiber membrane module having a high pack density can be produced. Accordingly, the dry air flowing outside the bundle of the hollow fiber membranes is spread over the entire area of the membrane. Accordingly, the water-permeability from the off gas to the dry air can be enhanced and the pressure loss of the passage of the dry air can be decreased.

[Third Process]

According to the third process for producing a hollow fiber membrane module which can align the hollow fiber membranes in straight, the pack density of the hollow fiber membrane HF in the hollow fiber membrane module is set at from 30% to 40% (see FIG. 10).

The reason why the pack density of the hollow fiber membrane HF in the hollow fiber membrane module 121 is at from 30% to 40% is as follows: If the pack density is lower than 30%, the gaps between the hollow fiber membranes become large, which tends to cause of the slack of the hollow fiber membrane. Conversely, if it exceeds 40%, the gaps between the hollow fiber membranes become unduly small, and once the hollow fiber membrane is entangled, there is no room for the alignment of As described above, by setting the pack density of the hollow fiber membranes in the hollow fiber membrane module 112 at from 30 to 40%, there exhibits the effect of aligning the hollow fiber membranes HF. Accordingly, the dry air flowing outside the bundle of the hollow fiber membranes is spread over the entire area of the membrane. Accordingly, the water-permeability from the off gas to the dry air can be enhanced and the pressure loss of the passage of the dry air can be decreased.

These processes can be combined as occasion demands. Also, these processes can be applied to any other membrane modules utilizing membranes other than the hollow fiber membranes.

The advantages of the counter flow and the parallel flow are as described in the first aspect. Also, temperature adjustment function of the humidifier are as described in the first aspect.

As described above, the embodiments of the aspect of the present invention has been described, but the present invention is not restricted thereto. For example, the humidifier according to the third aspect can be used to any applications other than fuel cell. Also, it is possible that the off gas flows outside the hollow fiber membranes while the dry air flows inside the hollow fiber membranes. Also, whereas the flow of the off gas is counter flow against that of the dry air, they may be parallel.

Also, the humidifier according to the first to third embodiments may be combined.

What is claimed is:

1. A humidifier having a bundle of water-permeable hollow fiber membranes placed along the lengthwise direction of a housing accommodated within the housing in which gasses each having a different moisture content flow inside and outside said hollow fiber membranes to carry out moisture exchange whereby the dry air having a low moisture content is humidified, said humidifier comprising a gas inlet which introduce the gas flowing outside the hollow fiber membranes within the housing formed on an area in adjacent to an end of said bundle of the water-permeable hollow fiber membranes within the housing.

2. A humidifier having a bundle of water-permeable hollow fiber membranes placed along lengthwise direction of a housing accommodated within the housing in which gasses each having a different moisture content flow inside and outside said hollow fiber membranes to carry out moisture exchange whereby the dry air having a low moisture content is humidified, said humidifier comprising an injector which injects the gas flowing outside the hollow fiber membranes placed directionally to an end of the lengthwise direction of the housing.

3. A humidifier having a bundle of water-permeable hollow fiber membranes placed along lengthwise direction of a housing accommodated within the housing in which gasses each having a different moisture content flow inside and outside said hollow fiber membranes to carry out moisture exchange whereby the dry air having a low moisture content is humidified, said humidifier comprising an injector which injects the gas flowing outside the hollow fiber membranes is placed toward the center of the lengthwise direction of the housing.

4. The humidifier according to claim 2 or 3, wherein a generator which generate a circular flow of the gas flowing outside the hollow fiber membranes injected from the injector is provided.

5. A fuel cell system having the humidifier according to any one of claims 1 to 3.

6. A humidification process utilizing a hollow fiber membrane module comprising a plurality water-permeable hollow fiber membranes placed along the lengthwise direction of a housing accommodated within the housing, in which gases each having a different moisture content flow inside and outside said hollow fiber membranes to carry out moisture exchange whereby the dry air having a low moisture content is humidified, said process comprising injecting the gas flowing outside the hollow fiber membranes toward an end of the lengthwise direction of the housing.

7. A humidification process utilizing a hollow fiber membrane module comprising a plurality of water-permeable hollow fiber membranes placed along the lengthwise direction of a housing accommodated within the housing, in which gases each having a different moisture content flow inside and outside said hollow fiber membranes to carry out moisture exchange whereby the dry air having a low moisture content is humidified, said process comprising injecting the gas flowing outside the hollow fiber membranes toward the center of the lengthwise direction of the housing.

8. A humidifier having a bundle of water-permeable hollow fiber membranes placed along the lengthwise direction of a housing accommodated within the housing in which gasses each having a different moisture content flow inside and outside said fiber membranes to carry out moisture exchange whereby the dry air having low moisture content is humidified, said humidifier comprising a gas inlet which introduce the gas flowing outside the hollow fiber membranes within the housing having a construction for generating a circular flow, and said humidifier having a construction for generating a turbulent flow provided on the inner surface of said housing.

9. A humidifier having a bundle of water-permeable hollow fiber membranes placed alone lengthwise direction of a housing accommodated within the housing in which gasses each having a different moisture content flow inside and outside said fiber membranes to carry out moisture exchange whereby the dry air having a low moisture content is humidified, said humidifier having a groove or grooves provided on the inner surface of the wall to make up a construction of generating a turbulent flow provided on the inner surface of said housing.

10. The humidifier according to claim 8, wherein the construction for generating a turbulent flow is a projection or projections provided on the inner surface of the housing.

11. A humidifier having a bundle of water-permeable hollow fiber membranes placed along lengthwise direction of a housing accommodated within the housing in which gasses each having a different moisture content flow inside and outside said fiber membranes to carry out moisture exchange whereby the dry air having a low moisture content is humidified, said housing swelled symmetrically with a lengthwise axis of housing to make up a construction for generating a turbulent flow provided on the inner surface of said housing.

12. A fuel cell system having the humidifier according to any one of claims 8 to 10.

13. A fuel cell system having the humidifier according to claim 11.

14. A humidification process utilizing a hollow fiber membrane module comprising a plurality of water-permeable hollow fiber membranes placed along the lengthwise direction of a housing accommodated within the housing, in which gases each having a different moisture content flow inside and outside said hollow fiber membranes to carry out moisture exchange whereby the dry air having a low moisture content is humidified, said process comprising generating a turbulent flow of the gas flowing outside said hollow fiber membranes within the inner surface of the housing.

15. A humidifier having a plurality of water-permeable hollow fiber membranes placed along the lengthwise direction of a housing accommodated within the housing in which gates each having a different moisture content flow inside and outside said hollow fiber membranes to carry out moisture exchange whereby the dry air having a low moisture content is humidified, said humidifier having a construction for generating a turbulent flow provided within the hollow fiber membranes.

16. The humidifier according to claim 15, wherein the construction for generating a turbulent flow is projections provided on the inner surface of the hollow fiber membrane.

17. The humidifier according to claim 15, wherein said projections are provided on the inner surface of the hollow fiber membrane by transferring fine particles having a UV curing resin applied thereon into the hollow fiber membrane followed by irradiating a ultraviolet light.

18. The humidifier according to claim 15, wherein the construction for generating a turbulent flow is a twisted fin provided at an inlet portion for introducing the gas into the interior of the hollow fiber membrane.

19. The humidifier according to claim 16, wherein the construction for generating a turbulent flow is a twisted fin provided at an inlet portion for introducing the gas into the interior of the hollow fiber membrane.

20. The humidifier according to any one of claims 15 to 19, wherein the construction for generating a turbulent flow is a step provided at an inlet portion for introducing the gas into the interior of the hollow fiber membrane.

21. A fuel cell system having the humidifier according to any one of claims 15 to 19.

22. A fuel cell system having the humidifier according to claim 20.

23. A humidification process utilizing a hollow fiber membrane module comprising a bundle of water-permeable hollow fiber membranes placed along the lengthwise direction of a housing accommodated within the housing, in which gases each having a different moisture content flow inside and outside said hollow fiber membranes to carry out moisture exchange whereby the dry air having a low moisture content is humidified, said process comprising generating a turbulent flow of the gas flowing inside said hollow fiber membranes providing a construction within said hollow fiber membranes.

* * * * *